US010979914B2

(12) United States Patent
Li et al.

(10) Patent No.: US 10,979,914 B2
(45) Date of Patent: Apr. 13, 2021

(54) COMMUNICATION NETWORK OPTIMIZATION BASED ON PREDICTED ENHANCEMENT GAIN

(71) Applicant: Facebook, Inc., Menlo Park, CA (US)

(72) Inventors: Ying Li, Menlo Park, CA (US); Vincent Gonguet, San Francisco, CA (US); Martinus Arnold de Jongh, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 87 days.

(21) Appl. No.: 16/389,226

(22) Filed: Apr. 19, 2019

(65) Prior Publication Data

US 2020/0336923 A1    Oct. 22, 2020

(51) Int. Cl.
*H04W 24/02* (2009.01)
*H04W 4/021* (2018.01)
*H04W 4/21* (2018.01)

(52) U.S. Cl.
CPC .......... *H04W 24/02* (2013.01); *H04W 4/021* (2013.01); *H04W 4/21* (2018.02)

(58) Field of Classification Search
CPC ........ H04W 24/02; H04W 4/021; H04W 4/21
USPC ............................................... 370/241, 252
See application file for complete search history.

(56) References Cited

U.S. PATENT DOCUMENTS

| 2008/0287139 | A1* | 11/2008 | Carlson | H04W 64/00 455/456.1 |
| 2015/0289146 | A1 | 10/2015 | Ouyang | |
| 2016/0037480 | A1* | 2/2016 | Bellamkonda | H04W 4/029 455/456.2 |
| 2017/0374566 | A1* | 12/2017 | Backholm | H04W 52/0277 |
| 2019/0228097 | A1* | 7/2019 | Kassa | G06F 11/3476 |

FOREIGN PATENT DOCUMENTS

WO    WO 2020018139 A1    1/2020

OTHER PUBLICATIONS

International Search Report and Written Opinion for International Application No. PCT/US2020/026247, dated Jun. 17, 2020.

\* cited by examiner

*Primary Examiner* — Obaidul Huq
(74) *Attorney, Agent, or Firm* — Baker Botts L.L.P.

(57) ABSTRACT

In one embodiment, a computing system may collect data samples associated with a geographic area of interest covered by a communication network. The system may aggregate the data samples into data points. The system may split the aggregated data points into two sets of data points using a first threshold of a first network metric. The system may determine a trend of a second network metric over the first network metric based on regression on the two sets of data points. The system may determine a predicted gain of the second network metric for a network enhancement operation based on the trend of the second network metric and a reference value of the first network metric. The system may generate network optimization recommendations for the geographic area of interest based at least in part on the predicted gain of the second network metric.

20 Claims, 13 Drawing Sheets

COMMUNICATION NETWORK OPTIMIZATION BASED ON PREDICTED ENHANCEMENT GAIN

TECHNICAL FIELD

This disclosure generally relates to communication network, and in particular, to optimizing communication network based on predicted network enhancement gain.

BACKGROUND

Communication networks, such as fiber-optic networks, cellular networks, and broadband wireless networks, provide data communication channels for computing systems (e.g., a computer, a tablet, a smartphone) to communicate data and information, such as, text, images, videos, website content, etc. A geographic area covered by a communication network may be divided into a number of sub-areas (e.g., tiles, cells in cellular networks, regions such as a county, an area of a collection of cities, towns, village, etc.). Each sub-area may generate certain amount of network traffic and the communication network may provide connection services to any number sub-areas covered by the communication network. Users may access the communication network (e.g., using a computing device) for downloading and uploading data. The communication network may have a bandwidth to allow the users to use services supported by the communication network.

SUMMARY OF PARTICULAR EMBODIMENTS

Particular embodiments described here relate to a method of predicting cell enhancement gain of one or more cell densification operations (e.g., adding cells) based on one or more network metrics (e.g., download speed, network traffic, number of samples). The system may first collect network performance data (e.g., network infrastructure data, application data) related to communication network cells over a period of time (e.g., 24 weeks) and aggregate the collected data into a series of data points (e.g., aggregated per hour per week). Then, the system may split the aggregated data points into two or more sets of data points and perform regressions (e.g., linear regression, non-linear regression) on each of these data point sets to determine one or more network metric trends (e.g., network traffic trend, download speed trend) based on the regression results. After that, the system may determine the predicted network metric value (e.g., total network traffic, download speed) after the cell densification based on the network metric trends and the current network metric value assuming that the cell densification happens at current time. Then, the system may determine the predicted cell enhancement gain by comparing the predicted network metric value (e.g., total network traffic, download speed) with the current network metric value. In particular embodiments, the system may further predict cell enhancement gain for a future cell densification assuming the cell densification will happen in a future time. The system may firstly predict the network metric value (e.g., network traffic, download speed) at that future time without cell densification. Then, the system may determine the predicted network metric value (e.g., total network traffic, download speed) for that future time assuming the cell densification happens at that time. After that, the system may determine the predicted cell enhancement gain of the future cell densification by comparing the predicted network metric value without the cell densification and the predicted network metric value with the assumed future cell densification. In particular embodiments, the system may use a weighted average method to determine cell enhancement gain by splitting data points into two sets of data points using a network metric threshold. The system may determine the predicted cell enhancement gain by comparing a first weighted average of a first set of data point and a weighted second average of all data points (including the first and second sets of data points).

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 8 illustrates an example user interface for predicting cell densification gain and displaying prediction results.

DESCRIPTION OF EXAMPLE EMBODIMENTS

Overview

Quality of Experience

Figure 1:
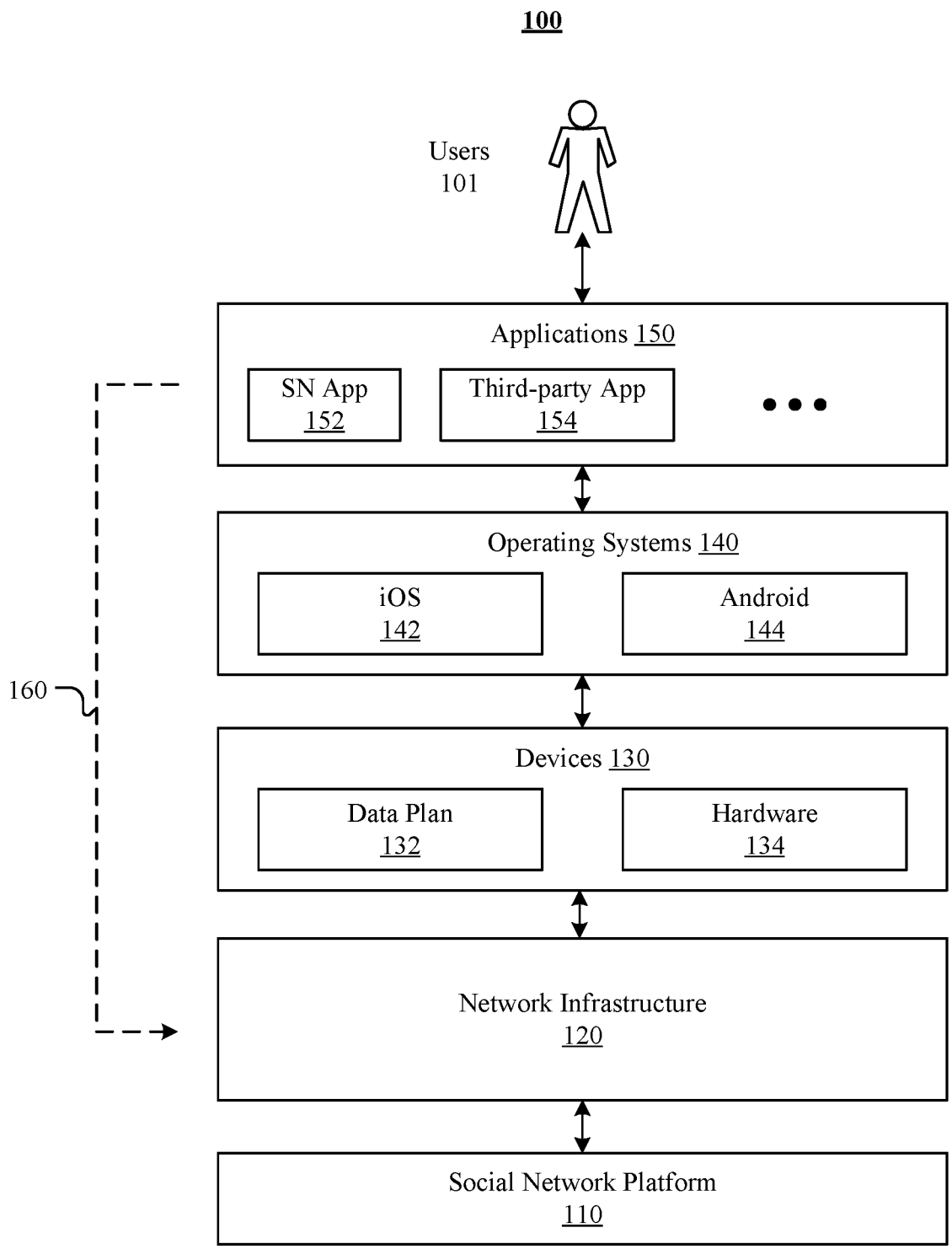
FIG. 1 illustrates an example system for optimizing network infrastructure based on application data.

Quality of experience (QoE) of end users or customers may be a general metric to indicate the degree of satisfactory of end users related to experiences (e.g., applications, connection services) related to a communication network. For example, QoE may be indicated by one or more parameters associated with end users experience at the mobile application level (e.g., download speed, network latency, network traffic, network congestion etc.). QoE may also be indicated by a metric derived from (e.g., by a mapping function) one or more network parameters (e.g., download speed, network traffic, latency, etc.). QoE may be one of the most important factors for communication network planning, monitoring, diagnosis, or/and optimization. The mobile network operators (MNOs) of the communication networks may need to understand which geographic areas have unsatisfied QoE and what are the service types (e.g., live video streaming, high-definition video downloading) that have low QoE. The MNOs may use this information to reduce the operating expenses (OPEX) (e.g., via reducing the complaints, tickets, lowering the network optimization cost) and to reduce the capital expenditures (CAPEX) (e.g., by most effectively pinpointing out where to add more cells and avoiding adding cells in unnecessary places) of the communication network. The MNOs could also use this information to recover or even boost the traffic volume with more revenue, which would have been suppressed due to unsatisfied QoE.

Furthermore, communication network engineering may need deeper insights understanding related to QoE. Such understanding could provide supporting inputs to MNOs for making decisions on whether to optimize the network and which aspect to optimize (e.g., whether to upgrade the network from current generation to next generation, whether to do the network expansion by adding more cells for cell densification, where and when to add new cells) directly or indirectly based on QoE. Particular embodiments of the system may link QoE to wireless communication engineering by providing information about whether the QoE of end users of a particular area (e.g., a cell, a tile, a region) is healthy and what could be the causes for unhealthy QoE from wireless network perspective (e.g., coverage issues, capacity issues, latency issues, etc.). The coverage and the capacity of the communication network may be two of the most important aspects for cellular engineering to understand the status and healthiness of the network. Particular embodiments of the system may use the data collected at the application level to generate models for identifying the areas of interest with coverage and capacity issues. The system may determine the trends of one or more network parameters in the areas of interest and predict cell enhancement gain based on these parameter trends. The system may generate optimization recommendations for optimizing the network in these areas based at least on the predicted cell enhancement gain. The system may optimize the communication network based on the optimization recommendations to improve the network performance and QoE of end users.

Problems

Traditional technologies and systems for optimizing communication networks may monitor network traffic of cellular towers (e.g., 100 k) at network infrastructure level and optimize network performance based on the monitored network traffic. For example, the systems may include instrumentations carried by a measurement vehicle driving around in the network for measuring network performance. However, these technologies and systems are very inefficient and limited in capability. For example, they cannot detect network capacity and coverage problems for the large number of cells of cellular networks. The network optimization that only relies on network infrastructure level information has many shortcomings which could lead to suboptimal results. For example, traditional systems cannot predict the optimization gain of network metrics related to user QoE at application level. As another example, traditional network optimization technologies and systems cannot directly evaluate the network optimization impact on the QoE of end users because lack of effective means to obtain application usage data at application level.

Solution

Particular embodiments of the system may collect network related data at application level (e.g., application names, application types, time duration, quality of experience, network speed, latency, network coverage) and provide supporting and feedback information to the network infrastructure optimization (e.g., at infrastructure level) based on the collected network related data. Throughout the disclosure, network data, network related data, network data samples, may refer to the data samples related to the network, where the data samples may be collected via the application layer. Particular embodiments of the system may identify areas of interest with network capacity or coverage problems and predict the gain of one or more network enhancement/optimization operations of current time or a future time. Particular embodiments of the system may generate network optimization recommendations (e.g., where and when to add new cells for densification) based on the precited gain of the network enhancement operations. Particular embodiments of the system may optimize the communication network infrastructure (e.g., cell densification, cell upgrading, cell tuning, network traffic offloading) based on the generated network optimization recommendations.

Benefits

Particular embodiments of the system address the limitations and shortcomings of existing network optimization technologies and systems by providing technological solutions for monitoring, evaluating, predicting, and optimizing the network performance. Particular embodiments of the system may optimize the communication (e.g., infrastructure level, application level) based on information from both infrastructure level and application level instead of information from infrastructure level only, and therefore improve network performance in ways that are not possible before. Particular embodiments of the system may provide more effective network optimization recommendations with reduced cost for improving the network performance. For example, the system may provide network optimization recommendations on whether to optimize the network in particular areas (e.g., high network traffic areas), which aspects to optimize for (e.g., network upgrading, network expansion, adding more cells, cell densification), where and when to implement the optimization (e.g., where and when to add cells for cell densification), what is the predicted gain, etc. Particular embodiments of the system may identify areas with network coverage and capacity issues and evaluate or/and predict enhancement gain at a previously prohibitable large scale with a higher speed and better accuracy.

Particular embodiments of the system may predict the gain and effectiveness of the network optimizations/enhancements from the users QoE perspectives based on the application data before the optimization happens and may evaluate the actual gain and effectiveness after the optimization. Particular embodiments of the system may optimize network infrastructure more effectively (e.g., by upgrading capacity, tuning cellular towers, adding cells, adding fiber links) and provide better QoE (e.g., higher network speed, less network traffic, less network latency) to end users of the networks. The system may reduce the operating expense (OPEX) (e.g., via reducing the complaints, tickets, lowering the network optimization cost), reduce the CAPEX (e.g., via most effectively pinpoint out where to add more cells and avoid adding cells in non-needed places), and recover or boost the traffic volume which would have been suppressed due to unsatisfied QoE.

Network Optimization System

FIG. 1 illustrates an example system 100 for optimizing network infrastructure based on application data. In particular embodiments, the system 100 may include a number of layers including, for example, a social network platform 110 (e.g., servers, databases), network infrastructure 120 (e.g., fiber networks, cellular towers, cable networks, switches), computing devices 130 (e.g., client devices, computers, smartphones, tablets), operating systems 140 (e.g., iOS 142, android 144), applications 150 (e.g., social network applications 152, third-party applications 154, operators' applications, carriers' applications or any suitable applications), users 101, etc. The social network platform 110 may provide content and services to users 101 through the network infrastructure 120 and the computing devices 130. The computing devices 130 may include device hardware 134 (e.g., computers, smartphones, tablets) and may be associated with particular data plans 132 provided by one or more carriers. The computing devices 140 may include an operating system (e.g., iOS 142, android 144) and a number of applications 150 (e.g., social network applications 152, third-party applications 154) running on the computing devices 130. The users 101 may interact with the applications 150 running on the computing devices 130 to access the content and services provided by the social network platform 110. In particular embodiments, the system 100 may collect data (e.g., application names, application types, time duration, quality of experience, network speed, latency, network traffic, total amount of data delivered, number of samples, signal strength, number of connected towers, signal stability status, network coverage, etc.) from the applications 150 running on the computing devices 130 used by the users 101. The system 100 may collect the application data through one or more application programming interfaces (APIs) provided by the social network platform 110 or third-parity entities (e.g., network carriers, operating system providers, application developers, application service providers). The system 100 may use the collected application data for monitoring the network performance, such as, detecting network capacity or coverage problems. The system 100 may provide network insights 160 (e.g., congested areas, congest alerts, coverage alerts, network traffic, network speeds, network latency, number of samples, network performance, etc.) based on the collected application data for the optimization of network infrastructure 120. The system 100 may also provide feedback information and network enhancement gain (e.g., improvements on network traffic, network speed, latency, or any QoE metrics) for the optimization operations taken on the network infrastructure 120.

In particular embodiments, the system 100 may monitor the communication network performance (e.g., network traffic, network coverage issues) based on the data from both front-end (e.g., user devices 130, applications 150, operating system 140, websites, search engines, etc.) and back-end (e.g., social network platform 110, network infrastructure 120, servers, switches, database, etc.) of the communication network. In particular embodiments, the system 100 may collect user experience data (e.g., network traffic, network speeds, network latency, signal stability status) from both front-end and back-end of the communication network. In particular embodiments, the system 100 may use the data collected from the front-end (e.g., applications) to generate optimization recommendations for the back-end network infrastructures 120 or/and social network platform 110. In particular embodiments, the system 100 may use the data collected from the back-end (e.g., social network platform 110, network infrastructure 120) to generate optimization recommendations for the front-end user experience (e.g., applications 150, operating system 140, user devices 130, data plan 132, network speeds, latency, etc.). In particular embodiments, the system 100 may determine one or more network performance metrics (e.g., network traffic, network speed, number of samples) and compare the network performance metrics to respective threshold values to detect network capacity problems in one or more areas covered by the communication network. In particular embodiments, the system 100 may determine one or more network coverage metrics (e.g., signal strength, number of connected towers, signal stability status) and compare the network coverage metrics to respective threshold values to detect the network coverage issues.

Network Optimization Framework

Figure 2:
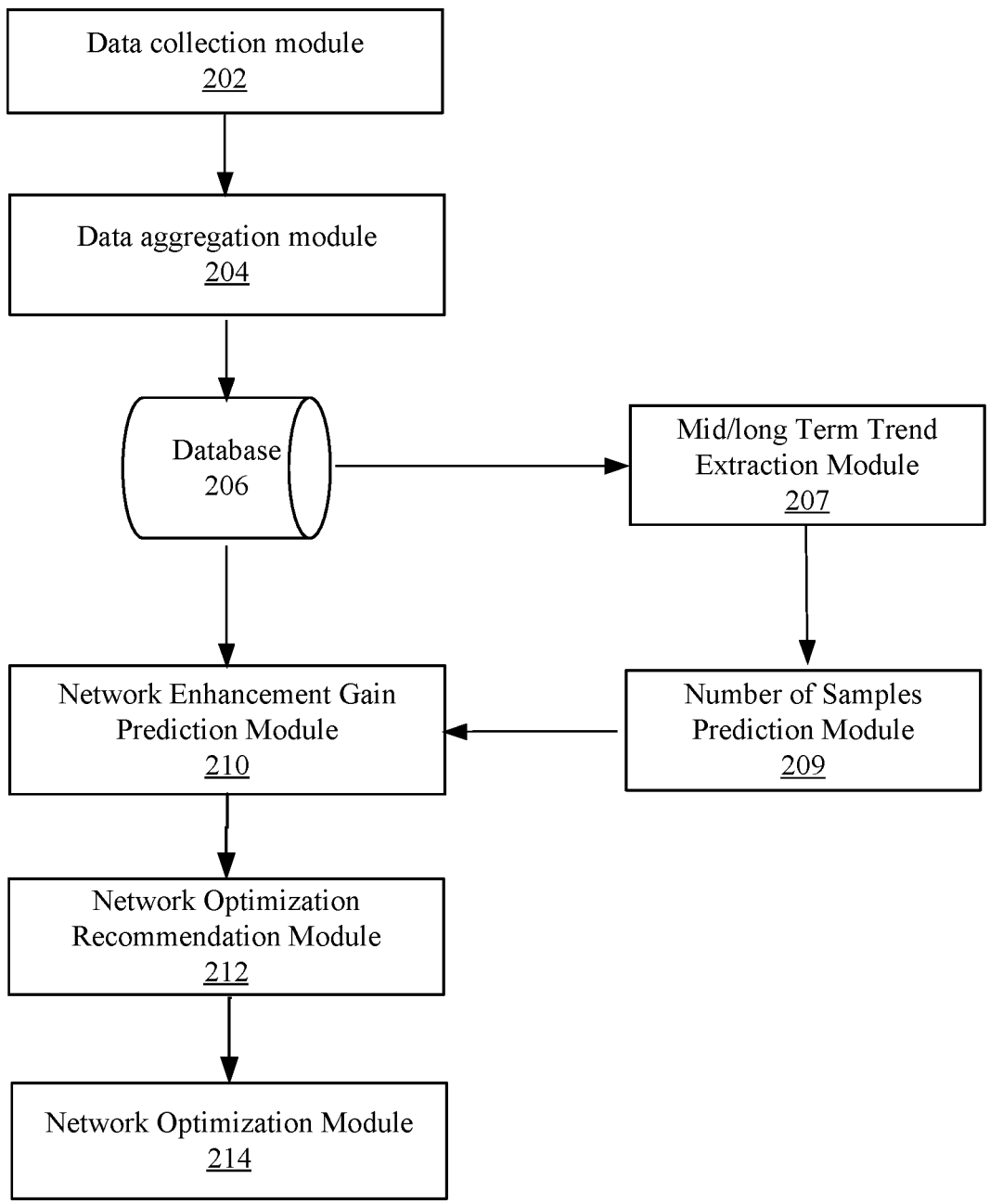
FIG. 2 illustrates an example framework for optimizing communication network based on predicted network enhancement gain.

FIG. 2 illustrates an example framework 200 for optimizing communication network based on predicted network enhancement gain. In particular embodiments, the framework 200 may be implemented on the social network platform 110 (e.g., social network servers), third-party platforms (e.g., third-parity servers), or any computing systems that may coordinate with the network infrastructure 120 and user devices 130 to collect application data and predict network enhancement gain. In particular embodiments, the framework 200 may include a data collection module 202, a data aggregation module 204, a database 206, a mid/long term trend extraction module 207, a number of samples prediction module 209, a network enhancement gain prediction module 210, a network optimization recommendation module 212, a network optimization module 214, etc. In particular embodiments, the data collection module 202 may collect application data from a number of computing devices (e.g., via APIs). Then, the collected data may be preprocessed and aggregated by the data aggregation module 204 into a series of data points (e.g., aggregated per hour per week or per hour per any number of days). The aggregated data may be stored in the database 206 and fed to the network enhancement gain prediction module 210. In particular embodiments, the data may be aggregated at cell level for a cellular network. The system may identify one or more sites (e.g., each site including one or more cells) with network capacity or coverage problems and predict network enhancement gain for the identified sites. For example, the network enhancement gain prediction module 210 may access data associated with one or more cells of a communication network and predict the gain for one or more cell enhancement operations to be taken on the cells. In particular embodiments, the system may predict network enhancement gain for a network enhancement operation assuming the network enhancement operation happens at current time. In particular embodiments, the system may predict network enhancement gain for a network enhancement operation assuming the network enhancement operation will happen at a future time. For example, the system may use the mid/long term trend extraction module 207 to determine the trends of one or more network parameters (e.g., network speed, network traffic, number of samples) over time. The system may use the number of sample prediction module 209 to predict the value of the number of samples for a future time and feed the predicted value of the number of samples to the network enhancement gain prediction module 210. Then, the network enhancement gain prediction module 210 may predict the network enhancement gain based on the predicted future value of the number of samples. After the predicted network enhancement gain has been determined, the network optimization recommendation module 212 may generate one or more network optimization recommendations based on predicted network enhancement gain. The network optimization module 214 may implement one or more network optimization operations based on one or more network optimization recommendations generated by the network optimization recommendation module 212.

Cell Enhancement Operations

Cell Enhancement

In particular embodiments, the system may optimize or enhance a communication network in one or more areas (e.g., areas with high network traffic, low network speed, high number of samples, etc.) to improve the QoE of end users in these areas. A cell of a communication network may be or include an access point using cellular technologies (e.g., 2G, 3G, 4G, 5G) or non-cellular technologies (e.g., Wi-Fi, Wi-Max, Bluetooth, visible light communications. The communication network may be optimized or enhanced by one or more cell enhancement operations (e.g., cell densification, cell upgrading) to improve the end user QoE of communication networks. For example, cell densification may be used to add one or more cells in an area connected by the communication network to densify the network with more cells in that area. As another example, cell upgrading (e.g., tuning antennas, increasing transmitting power, upgrading technologies) may be used to improve the communication network performance (e.g., improving network speed, improving signal strength and network coverage, reducing network latency) and improve the QoE of users in some or all cells of the communication network.

QoE Indicators

In particular embodiments, the system may collect network performance data and determine one or more network metrics based on the collected data as the QoE indicators. The network metrics may include, for example, but are not limited to, network speed (e.g., download speed, upload speed, round-trip communication speed, backhaul speed), network speed drop, network traffic, network latency, number of samples, busy hours, non-busy hours, network traffic of busy hours, network speed of busy hours, network traffic of non-busy hours, network speed of non-busy hours, congestion level, video watching experience related metrics (e.g., jitter, buffering time, freeze up time duration, freeze up time ratio against the watch time), etc. The system may use one or more of the network metrics as the QoE indicators and predict the network optimization gain based on the network metrics.

Network Traffic Gain Prediction

Data Collection

In particular embodiments, the system may collect the network performance data of a communication network at application level (e.g., social network applications, network operator applications, carrier applications, third-party applications, etc.) or/and infrastructure level (e.g., servers, routers, cell towers, network instrumentations). The data collected by the system may include network performance information related to QoE as experienced by application users (e.g., network traffic, network speed, number of samples, latency, network coverage, etc.) connected by the communication network. The raw application data may be logged based on requests from applications together with the time stamp associated which each application request. The collected data may include the cell identifications of serving cells that the user devices are connected to, location information of user devices (e.g., via APIs when user approves and enables location-based services of the devices), carrier information (e.g., network providers), etc. The cell identification of each cell may uniquely identify that cell and contain concatenated information such as air interface technology type information. The collected data may include the counters related to the total bits of information delivered and the time spent for delivery of that information. The collected data may be used to determine one or more network performance metrics. For example, the counters of the total bits of the information delivered and the corresponding time spent for delivery of that information may be used to determine the download speed of the network.

In particular embodiments, the user devices may communicate with the social network platform through internet connections. The user devices may send communication request to and receive data from the social network platform back and force. In particular embodiments, the system may sample the requests with a particular sampling rate (e.g., one in one hundred). The system may record information related to the number of devices that are connected, the number of connecting requests, the time required for the requests to be received by the social network platform, the amount of data transmitted by the social network platform to the user devices, the time spent in transmitting that data to the user devices, etc. The system may determine, based on the collected data, a number of network parameters including, for example, the speed of connection (e.g., dividing the total bits processed by the time spent), the cells that the devices are connected to, information of carriers, types of devices, application versions, etc. The data may be continuously collected at the applications and may be periodically (e.g., daily or every several days) sent back to the social network platform for storage. The system may store the collected information in a database on which the system may run an information processing pipeline for monitoring the network performance.

Data Aggregation

In particular embodiments, the system may aggregate the collected data into a series of data points (e.g., per hour per week) over time or over any related network metrics. The collected data may be associated with one or more sites or areas covered by the communication network. Each site or area may include one or more cells of the communication network. The system may associate the collected data to each cell of the communication network based on the cell identifier which can uniquely identify the cell. Then, the system may aggregate the collected data into data points for all application data related to all the devices associated with each cell. The data aggregation may be performed in the time dimension or with respect to a related network metric (e.g., number of samples). As an example, the aggregated data can be per hour per each individual day. As another example, the aggregated data can be per hour per week. As another example, the aggregated data can be per hour all days of a duration of any number of days. The system may calculate the number of samples, network traffic volume and network speed based on the aggregated data (e.g., data of every hour for each individual day, data of every hour for each week, or data of every hour for a duration of N days (e.g., 7 days, 14 days, 28 days)).

In particular embodiments, the aggregated data points may be a series of data points over time with each data point being aggregated per hour and per week. For example, a series of aggregated data points covering a three-week time window may include 72 data points (e.g., 24×3=72 data points) with each data point aggregated over each hour and one week. Each data point may include information related to aggregated total network traffic (e.g., in the units of bits, bytes, Mbits, Mbytes, etc.) and aggregated total number of samples (from which the aggregated total traffic may be derived from). In particular embodiments, the aggregated data points may be a series of data points correlating one network metric (e.g., network traffic, network speed) to another network metric (e.g., number of samples). For example, the aggregated data points may be a series of network traffic data points over the number of samples and may be used for determining network traffic trend using regression. As another example, the aggregated data points may be a series of network speed data points over the number of samples and may be used for determining network speed trend using regression. It is notable that "data point" and "data sample" have different meanings in this disclosure. Data points which are used in regression, may each be an aggregation of multiple data samples, which may be the raw data sample or the raw requests that are logged. For example, a data point may include 1000 data samples for a particular hour over a week aggregation and may correspond to 4×1E7 bytes of total traffic of these samples. Each sample may represent a request of the end user from the application. After having the data points, the system may clean the data by removing the outlier data points.

Mid/Long Term Network Metric Trend

In particular embodiments, the system may determine one or more network metric trends by performing regression on the aggregated data points. The network metric trends may be a function or a regression of one or more network parameters (e.g., network traffic, network speed, number of samples, signal strength, distribution of packet sizes, time, etc.) over another parameter (e.g., number of samples, time, etc.). For example, the system may determine a download speed trend with respect to the number of samples by performing regression on the aggregated data points correlating the download speed to the number of samples. As another example, the system may determine a network traffic trend with respect to the number of samples by performing regression on the aggregated data points correlating the network traffic to the number of samples. As another example, the system may determine a number of sample trends with respect to the time by performing regression on the aggregated data points correlating the number of samples to time.

In particular embodiments, the system may perform regression on one network metric or parameter over an independent variable (IV). For example, the system may a regression function y=f(x), where y may be the dependent variable (DV) and x may be the independent variable (IV). The system may use the regression function y=f(x) to determine a trend of a network metric over a correlated parameter (e.g., network speed over number of samples, network traffic over number of samples, number of samples over time, etc.). In particular embodiments, the system may perform regression on multiple parameters by extending the regression of one parameter to a vector or a combination of multiple parameters. For example, for the regression function y=f(x), the independent variable (IV) x may be a vector or a combination of multiple parameters (e.g., number of samples, network traffic, network speed, signal strength, time, distribution of packet sizes, etc.).

Figure 3:
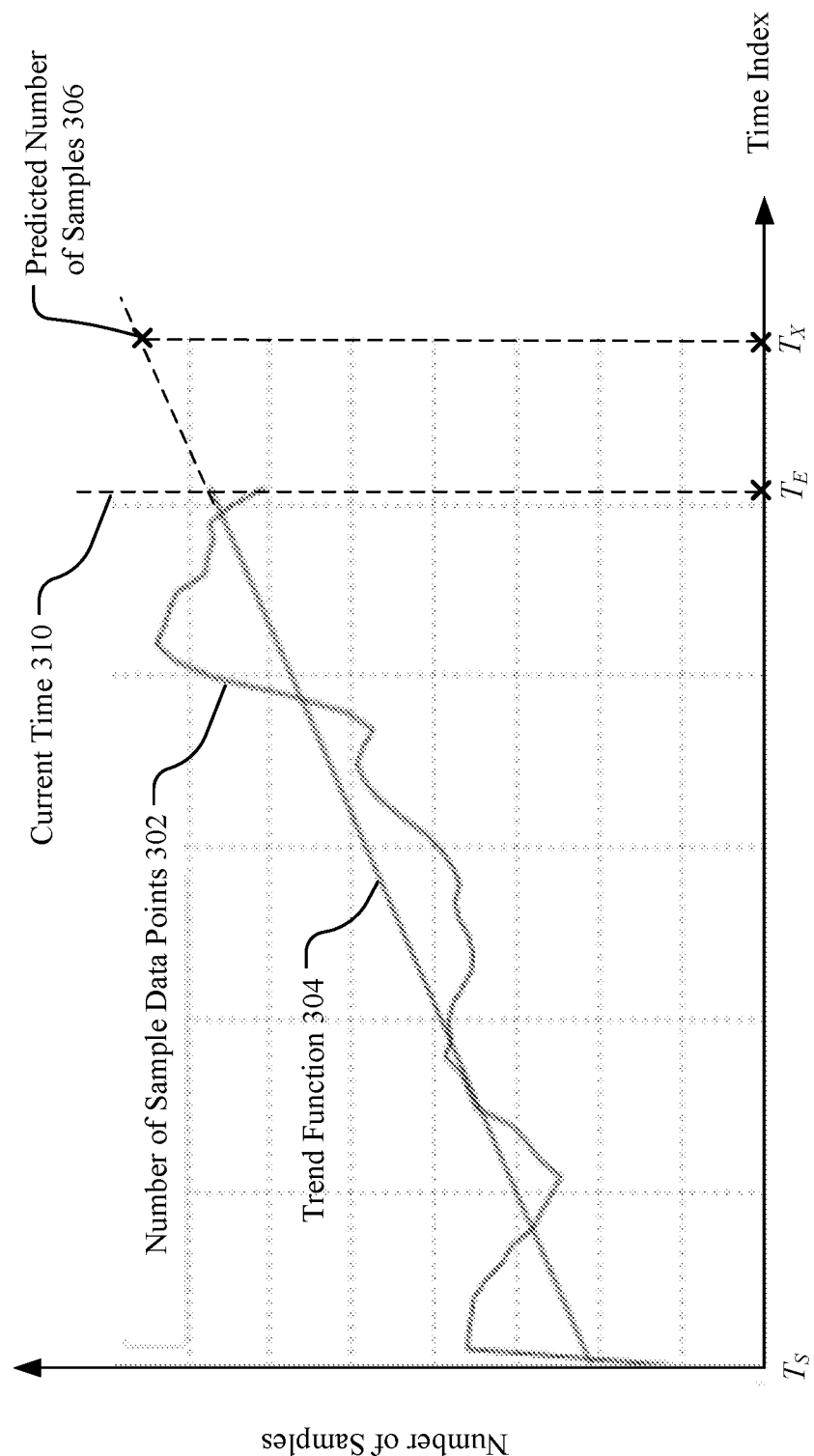
FIG. 3 illustrates an example trend function of number of samples over time determined based on a linear regression.

FIG. 3 illustrates an example trend function 304 of number of samples over time determined based on a linear regression. In particular embodiments, the system may determine a mid/long term trend for total number of samples of a cell by performing linear regression or non-linear regression on the aggregated data points over a period of time (e.g., several weeks, several months, one or more years). In particular embodiments, the system may use a linear regression function u=k×v+b to determine the trend of the number of samples, where k is the slope, b is the intersection, v is the time index of the weeks over the period of time (e.g., 52 weeks, a year, N years), and u is the total number of samples. For example, the system may use the linear regression function u=k×v+b to determine the trend function 304 based on the number of sample data points 303 over the period of time from a starting time $T_S$ to an end time $T_E$. In particular embodiments, $T_E$ may correspond to the current time 310 and the period of time from $T_S$ to $T_E$ may cover a recent past period of time (e.g., past 52 weeks, past year, past N years). In particular embodiments, the system may determine the trend function 304 using a non-linear regression or a combination of linear regression and non-linear regression. In particular embodiments, the system may use the trend function 304 to predict the value of the number of samples for a future time. For example, the system may extend the trend function 304 beyond the time period from $T_S$ to $T_E$ using the same slope and determine the predicted number of samples 306 for a future time $T_X$. In particular embodiments, the system may use the trend function 304 to predict the increase of the total number samples over a period of time. For example, for a given time window of W weeks, the system may determine the total increase of the total number of samples using k×W, where k is the slope of the trend function 304. In particular embodiments, the system may determine the mid/long term network metric trend using a sliding time window (e.g., 28-day time window, a 4-week sliding time window including week $V_{-3}$, $V_{-2}$, $V_{-1}$, $V_0$) instead of using the total number of samples of each past week. For example, the system may aggregate the collected data into data points for a time 28-day window (e.g., the past 28 days from current time) and use linear or non-linear regression on the data points to determine the network metric trend with respect to the 28-day time window. The system may incrementally update the aggregated data points based on the time window and the calculated trend function periodically (e.g., daily, weekly, monthly). The incrementally updated data points and trend function may provide more accurate prediction for future time by factoring in the recently collected and aggregated data points.

Regression on Multiple Data Sets

In particular embodiments, the system may determine one or more network metric trends with respect to another network parameter (e.g., network traffic trend with respect to the number of samples, network speed trend with respect to the number of samples, number of sample trend with respect to time, etc.). In particular embodiments, the system may split the aggregated data points into two or more data point sets and perform regression on the split data point sets to determine the network metric trends. For example, the system may generate W-week data points aggregated per hour per week, which may include 24×W total data points (24 hours×W weeks). The system may split the data points to two sets using a threshold (e.g., 50-percentile threshold or median value threshold) of the total number of samples (or the total number of requests logged). By splitting the data points using this threshold, the system may determine a first data set including 12×W data points below the threshold and a second data set including 12×W data points above the threshold. The system may use a first regression function $y=f_1(x)$ on the first data set (with x<=threshold) and a second regression function $y=f_2(x)$ on the second set (with x>threshold), where x is the total number of samples, and y is the network metric of interest (e.g., network traffic, network speed). In particular embodiments, the first and second regression functions may either be a linear regression function or a non-linear regression function (e.g., logarithm function). For example, the system may use linear regression on both the first and second data sets. As another example, the system may use linear regression on the first data set and use non-linear regression on the second data set. As another example, the system may use linear regression on the first data set and use non-linear regression on all data point including the first and second sets of data points.

Network Traffic Regression Examples

Figure 4A:
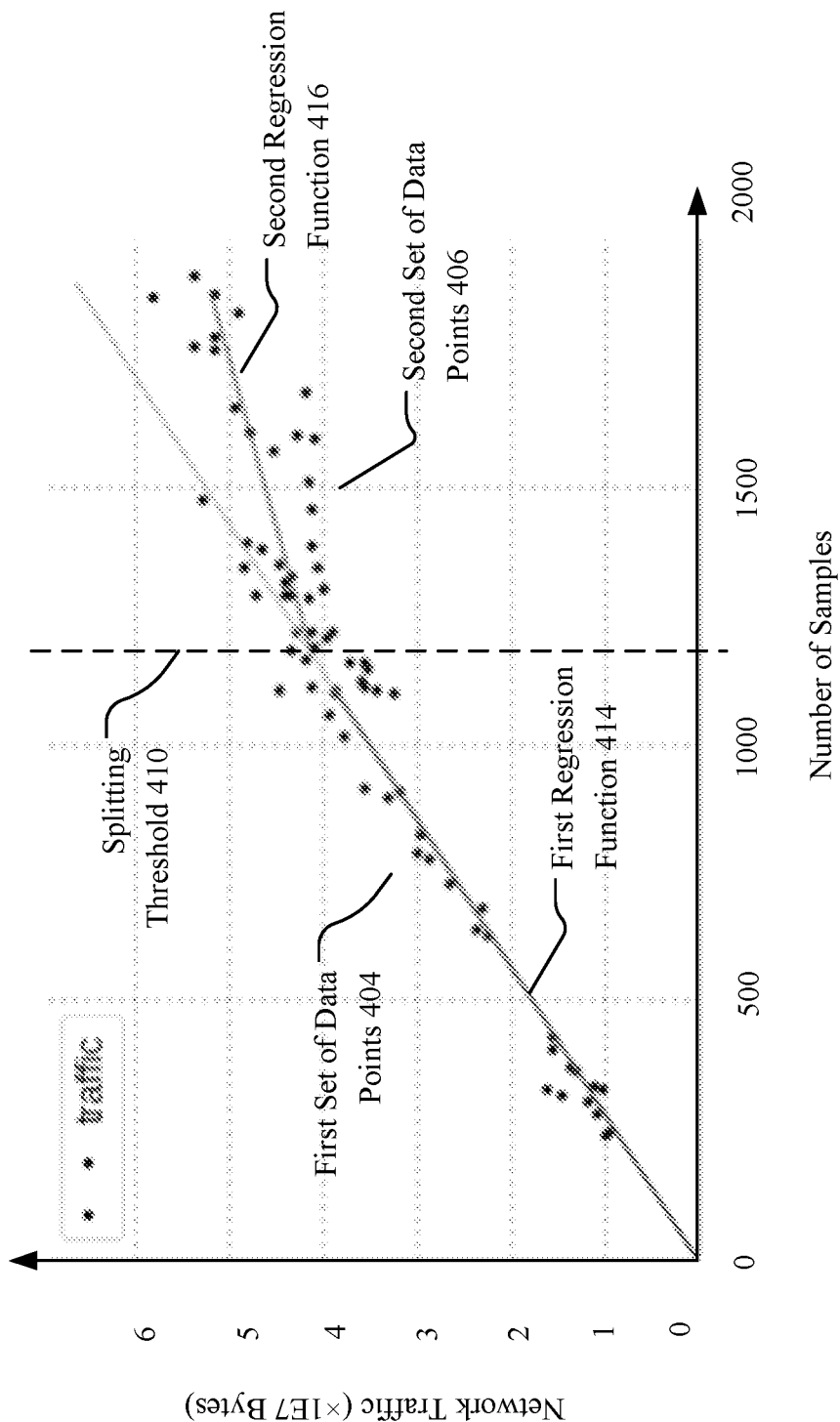
FIGS. 4A-C illustrate example regression on aggregated data points for determining network traffic trend with respect to number of samples.
Figure 4B:
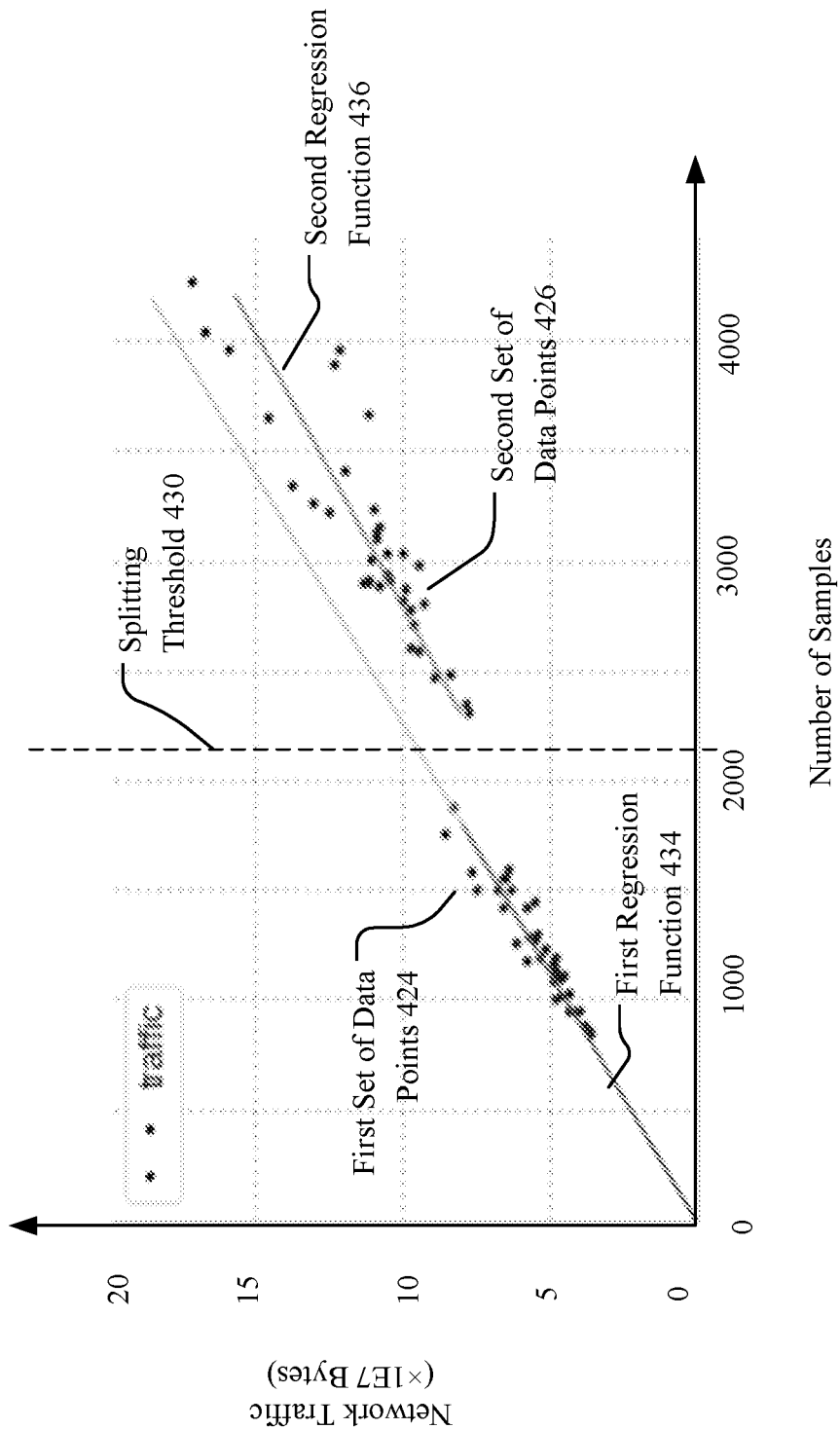
Figure 4C:
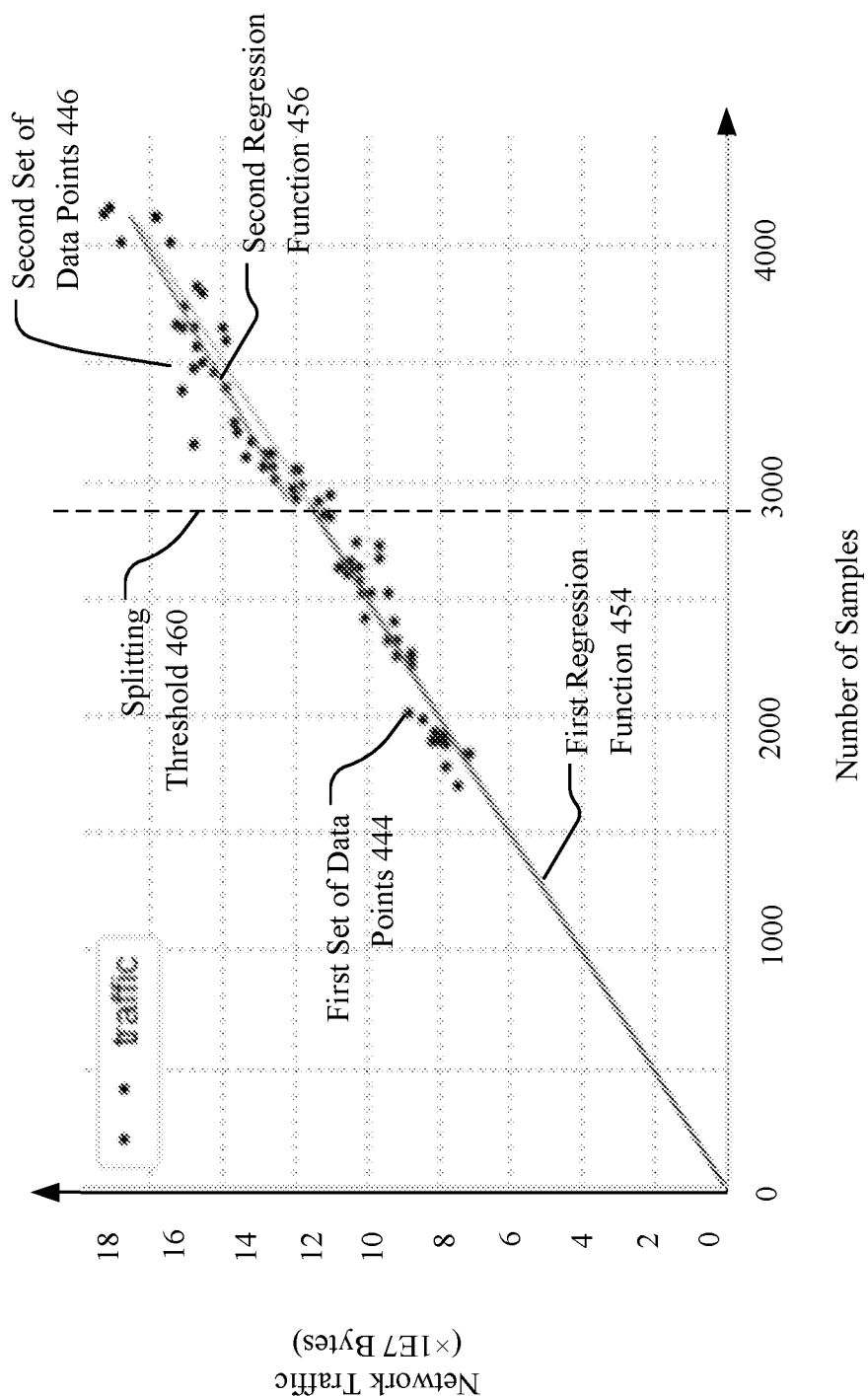

FIGS. 4A-C illustrate example regression on aggregated data points for determining network traffic trend with respect to number of samples. As an example and not by way of limitation, the system may generate the aggregated data points (e.g., aggregated per hour per week) correlating the network traffic to the number of samples, as shown in FIG. 4A. The system may determine a splitting threshold 410 (e.g., 50-percentile threshold or a median value threshold) and split the data points into a first set of data points 404 and a second set of data points 406. Then, the system may perform regression on the first set of data points 404 using a first regression function 414 of $y=f_1(x)$ to determine the trend function based on the first set of data points (for x<=splitting threshold 410). For network traffic, the system may assume that the regression function $y=f_1(x)$ goes through origin (i.e., $0=f_1(0)$, when there is zero sample, there is zero network traffic). The system may perform regression on the second set of data points 406 using a second regression function 416 of $y=f_2(x)$ to determine the trend based on the second set of data point 416 (for x>splitting threshold 410). The first and second regression functions may be linear or non-linear regression functions. For example, the first and second regression functions may both be linear regression functions with different slope or/and intersection values. As another example, the first regression function may be a linear regression function with the second regression function being non-linear regression function (e.g., logarithm function). As another example, the first regression function may be a non-linear regression function with the second regression function being a linear regression function. As another example, both the first and second regression functions may be non-linear regression functions.

As another example and not by way of limitation, the system may generate the aggregated data points (e.g., aggregated per hour per week) which correlate the network traffic to the number of samples, as shown in FIG. 4B. The system may determine a splitting threshold 430 (e.g., 50-percentile threshold or a median value threshold) and split the data points into a first set of data points 424 and a second set of data points 436. Then, the system may perform regression on the first set of data points 424 using a first regression function 434 of $y=f_1(x)$ to determine the trend function based on the first set of data points (for x<=splitting threshold 430). For network traffic, the system may assume that the regression function $y=f_1(x)$ goes through origin (i.e., $0=f_1(0)$, when there is zero sample, there is zero network traffic). The system may perform regression on the second set of data points 426 using a second regression function 436 of $y=f_2(x)$ to determine the trend function based on the second set of data points 426 (for x>splitting threshold 430). The first and second regression functions may be linear or non-linear regression functions.

As another example and not by way of limitation, the system may generate the aggregated data points (e.g., aggregated per hour per week) which correlate the network traffic to the number of samples, as shown in FIG. 4C. The system may determine a splitting threshold 460 (e.g., 50-percentile threshold or a median value threshold) and split the data points into a first set of data points 444 and a second set of data points 446. Then, the system may perform regression on the first set of data points 444 using a first regression function 454 of $y=f_1(x)$ to determine the trend function based on the first set of data points (for x<=splitting threshold 460). For network traffic, the system may assume that the regression function $y=f_1(x)$ goes through origin (i.e., $0=f_1(0)$, when there is zero sample, there is zero network traffic). The system may perform regression on the second set of data points 446 using a second regression function 456 of $y=f_2(x)$ to determine the trend function based on the second set of data points 446 (for x>splitting threshold 460). The first and second regression functions may be linear or non-linear regression functions. It is notable that the methods discussed in this disclosure are for example purpose and the methods are applicable when one or more parameters are changed, for example, the duration of the data used, the number of sets (to split data points to), the number of regressions to be performed, the threshold to split the data, etc.

Other Regression Methods

In particular embodiments, the system may split the aggregated data points into two or more sets of data points into busy hours and non-busy hours and perform regression on respective busy hour and non-busy hour data points. In particular embodiments, the system may take the bottom X percent of total number samples as non-busy hours and take top Y percent of total number of samples as busy hours and spit the data points into two or more sets of data points based on the busy hour and non-busy hour thresholds. As an example and not by way of limitation, the system may take the bottom 50% of total number of samples as the non-busy hours and take the top 50% of total number of samples as the busy hours, and split the aggregated data points into a first set of data points of non-busy hours and a second set of data points of busy hours. As another example, the system may take the bottom 60% of the total number of samples as the non-busy hours and take the top 60% of total number of samples as the busy hours and split the aggregated data points into a first set of data points of non-busy hours and a second set of data points of busy hours. In this case, the first and second sets of data points may have some overlap data points. As another example, the system may take the bottom 40% of the total number of samples as non-busy hours and take the top 30% of the total number of samples as busy hours. In this case, the system may split the aggregated data points into at least three sets of data points (e.g., top 30% number of samples, bottom 40% number of samples, the remain 30% between the top 30% and bottom 40%). The system may perform regression on the three sets of data points using three regression functions (e.g., piece-wise linear or non-linear regression functions with three intervals).

Figure 7:
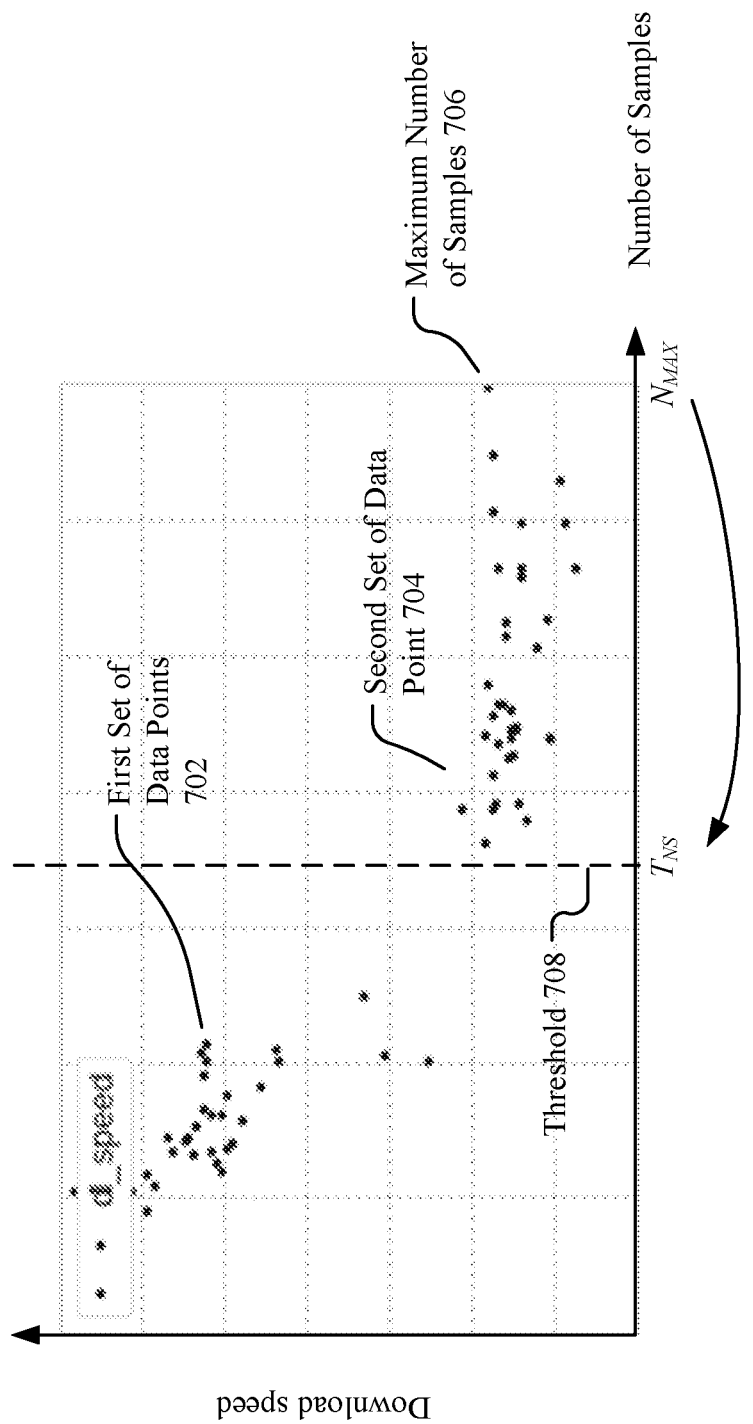
FIG. 7 illustrates an example process for predicting download speed gain using a weighted average method.

In particular embodiments, the system may perform bucketing operations on the aggregated data points before performing regression. Then, the regression may be performed on the data points resulted from bucketing operations. For example, the input of the bucketing may be the dots as shown in FIG. 7 where each dot may represent download speed (referred as "dl_speed" in FIG. 7) with respect to number of samples (e.g., x=number of samples, y=dl_speed). The output of the bucketing may include N data points and each data point may represent bucketed download speed with respect to bucketed number of samples (e.g., x'=bucketed number of samples, y'=bucketed dl_speed). The interval of number of samples $[0, N_{MAX}]$ may be divided to N intervals of equal length. The bucketed number of samples may be the center of each bucket of the number of samples and the bucketed download speed may be, for example, the mean or median of the download speed of those dots falling into the bucket. For instance, if $N_{MAX}=1000$, N=10, the system may generate 10 buckets, with the first bucket corresponding to 0<number of samples <=100, the second bucket corresponding to 100<number of samples <=200, . . . , the 10th bucket corresponding to 900<number of samples <=1000. Then, the system may determine each bucketed data point for each bucket. For example, for the first bucket, the system may get a data point (x'=50, y'=mean or median of y, where 0<number of samples <=100). For the second bucket, the system may get a data point (x'=150, y'=mean or median of y, where 100<number of samples <200), and so on. Then, after the bucketing operations, in this particular example, the system may get 10 data points. Then, the regression can be performed on these 10 data points (x', y') representing the bucketed download speed with respect to bucketed number of samples, instead of those dots (x, y) before the bucketing operation as shown in FIG. 7. For example, the system may generate bucketed data points for number of samples using all the hourly data of a period of time (e.g., past 28 days) and daily aggregated data points (e.g., 28 days x24 data points). As another example, the system may generate bucketed data points for number of samples using all the hourly data of a period of time (e.g., past 28 days) and weekly aggregated data points (e.g., 4 weeksx24 data points). In particular embodiments, the system may perform regression on all data points (including all sets of data points) using a linear or non-linear regression function (e.g., logarithm function) to determine the network metric trend (e.g., network traffic trend, network speed trend). It is notable that, in this disclosure the network traffic is used as an example network metric for explaining the regression methods and processes, and the network metric is not limited to network traffic. The regression methods and processes as described in this disclosure are applicable to any network metrics including, for example, but not limited to, network traffic, network speed (e.g., download speed, upload speed, round-way communication speed, backhaul speed), number of samples, network congestion metric, network latency, video watching experience related metrics (e.g., jitter, buffering time, freeze up time duration, freeze up time ratio against the watch time), or any suitable network metrics.

Predicting Network Traffic Gain for Cell Densification at Current Time

In particular embodiments, the system may predict the cell enhancement gain of one or more cell enhancement operations (e.g., cell densification, cell upgrading) based on one or more network metric trends determined based on regression of the aggregated data points. For example, the system may determine the network traffic trend of a cell and predict the network traffic gain caused by cell densification at current time or at a future time. For example, the system may generate a number of data points aggregated per hour per week and perform regression on these data points to determine the network traffic trend with respect to the number of samples. The system may correlate the network traffic (e.g., in units of Gbytes, Mbytes, etc., but not in unit of number of samples) to the number of samples derived from the data points. In particular embodiments, the network traffic trend with respect to the number of samples may include a linear curve portion and a bending curve portion. When the number of samples falls within the range corresponding to the linear curve portion, the network traffic may increase approximately linearly when the number of samples increases. When the number of samples falls within the range corresponding to the bending curve portion, the network traffic trend may start to bend when the number of samples increases. This may indicate that number of samples may have become so large that the network traffic cannot catch up with the number of samples because of the network capacity limitation. In this case, some of users' QoE may be negatively impacted, for example, with reduced network traffic, reduced download speed, increased network latency, etc.

In particular embodiments, the system may split the data points into two data point sets using a number of sample threshold (e.g., 50-percentile threshold or median value threshold of the number of samples). The system may determine a first trend function $y=f_{T1}(x)$ of the network traffic based on the first set of data point which are below the threshold (x<the number of sample threshold) and determine a second trend function $y=f_{T2}(x)$ of the network traffic based on the second set of data points which are above the threshold (x>the number of sample threshold). The first and second trends may be determined based on linear regression or non-linear regression. For the regression itself, the system may use linear regression or non-linear regression. As an example, the system may apply linear regression on both the first and the second sets. As another example, the system may apply linear regression on the first set and non-linear regression on the second set. As another example, the system may apply linear regression on the first set and non-linear regression on the whole set which may include data points of the first set and the second set. For regression function $y=f_{T1}(x)$, the system may make it go through the origin, i.e., $f_{T1}(0)=0$, assuming when there is zero sample, there is zero traffic.

For predicting the cell densification gain for network traffic, the system may determine the current network traffic value based on measured network traffic at application level or infrastructure level. The system may calculate the predicted network traffic value after the cell densification based on the determined network traffic trends (e.g., the first and second trend functions) and the current network traffic value. The system may assume that the newly added cell has the same or similar network capacity with the currently exiting cell and assume that the network traffic splits between the newly added cell and the previously existing cell approximately equally (e.g., about 50%-50% split). The system may determine the total number of traffic (including the previously existing cell and the newly added cell) after the cell densification by doubling the predicted network traffic of a single cell (either the previously existing cell or the newly added cell). The system may determine the network traffic gain of the cell densification by comparing the predicted total network traffic (including the previously existing cell and the newly added cell) with the current network traffic value without the cell densification. In particular embodiments, the system may calculate the predicted cell enhancement gain using the equation (1) and calculate the predicted gain of traffic in percentage using the equation (2) as follows:

$$\text{Gain} = 2 \times f_{T1}\left(\frac{x}{2}\right)\Big|_{0.5x \leq thr} + 2 \times f_{T2}\left(\frac{x}{2}\right)\Big|_{0.5x > thr} - f_{T1}(x)|_{x \leq thr} - f_{T2}(x)|_{x > thr} \quad (1)$$

$$\text{Gain} = \left[2 \times f_{T1}\left(\frac{x}{2}\right)\Big|_{0.5x \leq thr} + 2 \times f_{T2}\left(\frac{x}{2}\right)\Big|_{0.5x > thr} - f_{T1}(x)|_{x \leq thr} - f_{T2}(x)|_{x > thr}\right] \times \frac{100\%}{f_{T1}(x)|_{x \leq thr} + f_{T2}(x)|_{x > thr}} \quad (2)$$

where x is the number of samples, thr is the threshold to separate the two data sets aforementioned as an example, the notation of $f(x)|_{x \leq thr}$ means $f(x)$ for $x <= thr$, and the notation of $f(x)|_{x > thr}$ means $f(x)$ for $x > thr$. In particular embodiments, the system may use the current total traffic in the current cell, which could be the sum of the total traffic of all the data samples, to replace the second trend functions in the equations of (1) and (2) and use the equations (3) and (4) to calculate the predicted gain and predicted gain in percentage as follows:

$$\text{Gain} = 2 \times f_{T1}\left(\frac{x}{2}\right)\Big|_{0.5x \leq thr} + 2 \times f_{T2}\left(\frac{x}{2}\right)\Big|_{0.5x > thr} - T_{CR} \quad (3)$$

$$\text{Gain} = \left[2 \times f_{T1}\left(\frac{x}{2}\right)\Big|_{0.5x \leq thr} + 2 \times f_{T2}\left(\frac{x}{2}\right)\Big|_{0.5x > thr} - T_{CR}\right] \times \frac{100\%}{T_{CR}} \quad (4)$$

where, $T_{CR}$ is the total current traffic. It is totable that, the system may use large units (e.g., GBytes, Mbytes, Gbits, Mbits, etc.) to calculate the network traffic or/and the total current traffic to avoid the calculation overflow caused by relatively small units (e.g., bits, or bytes).

Figure 5A:
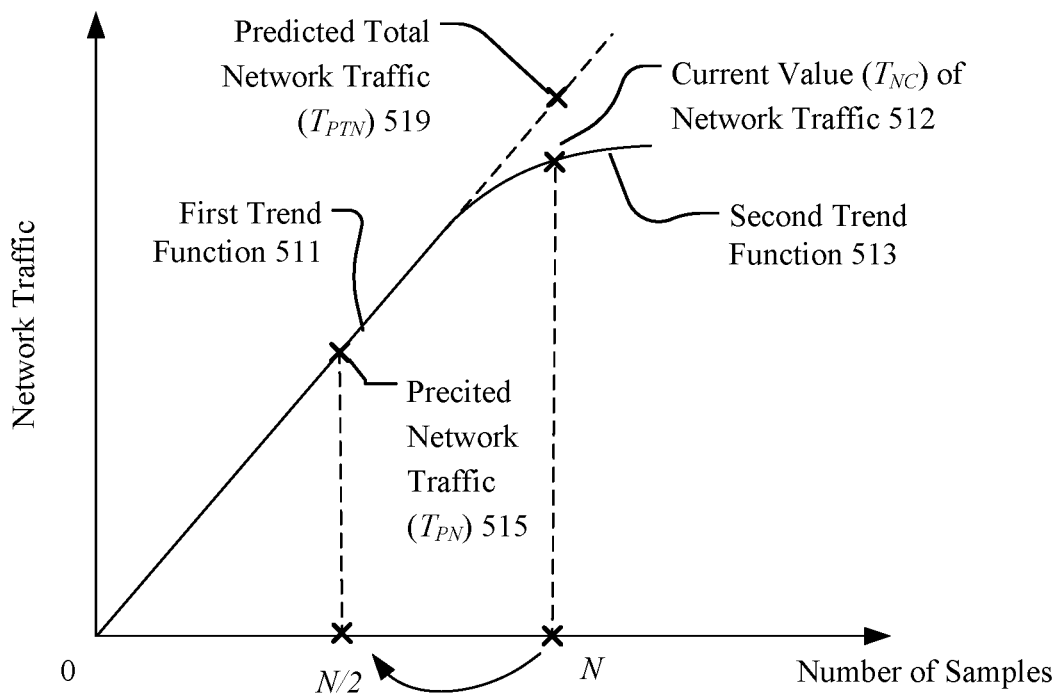
FIG. 5A illustrates an example process for determining predicted network traffic gain for a cell densification operation at current time.

FIG. 5A illustrates an example process for determining predicted network traffic gain for a cell densification operation at current time. In particular embodiments, the system may assume a network enhancement operation (e.g., cell densification) to be taken in an area (e.g., a cell) of the communication network at current time and predict the network enhancement gain based on the network metric trends. As an example and not by way of limitation, the system may use the regression methods as described earlier in this disclosure to determine a first trend function 511 and a second function 513 for the network traffic trends with respect to the number of samples. The trend function 511 may be determined based on a first set of data points (e.g., with number of samples below the splitting threshold) and the trend function 513 may be determined based on a second set of data points (e.g., with number of samples above the splitting threshold). The system may first determine, based on the collected data, the current value of the number of samples N and the current value of network traffic $T_{NC}$ 512 of the cell of interest. Then, the system may assume the cell densification operation includes adding a new cell to improve the network capacity and coverage. For simplification, the system may assume the newly added cell has similar or same network capacity with the existing cell and the network traffic will split approximately 50%-50% between the exiting cell and the newly added cell. The system may determine the predicted number of sample value of a single cell (e.g., the existing cell or the newly added cell) as half of the number of samples before the cell densification (i.e., N/2). Then, the system may determine the predicted network traffic $T_{PN}$ 515 using the first trend function 511 which is a linear function in this example. Then, the system may determine the precited total network traffic $T_{PTN}$ 519 as $2 \times T_{PN}$ based on the linear trend function 511. Then, the system may calculate the cell densification gain by comparing the current network traffic $T_{NC}$ 512 and the precited total network traffic $T_{PTN}$ 519. The cell densification gain may be determined by subtracting the current network traffic $T_{NC}$ 512 from the precited total network traffic $T_{PTN}$ 519 and may be positive gain in this example.

Predicting Network Traffic Gain for Cell Densification at a Future Time

In particular embodiments, the system may determine a mid/long term trend of the number of samples by performing regressions on the aggregated data points. For example, the system may use a linear regression function $u = k \times v + b$ (e.g., as illustrated in FIG. 3 and described in earlier section of this disclosure) for determining the trend of the number of samples, where k is the slope, b is the intersection, v is the time index of the weeks over the period of time (e.g., 52 weeks, a year, N years), and u is the total number of samples. The system may predict the value of the number of samples for a future time (e.g., 1 year later) based on the determined mid/long term tend and the current number of sample value. Then, the system may predict the network traffic at that future time based on the network traffic trends and the predicted number of samples at that future time. After that, the system may calculate the predicted network traffic value for that future time assuming the cell densification happens at that future time. The system may assume that the newly added cell has the same or similar network capacity with the previously exiting cell and determine that the network traffic splits between the newly added cell and the previously existing cell equally (e.g., about 50%-50%). The system may determine the total network traffic after the cell densification by doubling the predicted network traffic of a single cell (either the previously existing cell or the newly added cell). The system may determine the network traffic gain of the cell densification by comparing the predicted total network traffic (including the current existing cell and the newly added cell) with the predicted network traffic value without the cell densification. The cell densification gain may be determined by subtracting the predicted network traffic value without the cell densification from the predicted total network traffic (including the current existing cell and the newly added cell). When the predicted network traffic at that future time is lower than the current network traffic (e.g., because the increase of the number of samples in the bending curve range), the cell densification of the future time may have a larger gain than the cell densification of current time. In particular embodiments, the system may calculate the predicted gain of the network traffic for a future cell densification in W weeks using the equations of (1), (2), (3), and (4) by replacing the x with $x' = (b + k \times v)$, which is the predicted number of samples, where v is the index of the weeks. Each week the estimated gain of number of samples may be denoted by k (in absolute value, not a relative percentage). For any of the number of samples x, after W weeks, the number of samples may be predicted to be increased by ($k \times W$), with the predicted number of samples of $x' = (x + k \times W)$. If the percentage of the number of samples increase is denoted as k', where $k' = k/x$, then, the x' can be determined as $$k' = \frac{k}{b+k \times V}$$

x'=x×(1+k'×W). Alternatively, the k' and x' may be determined as and x'=x×(1+k'×W), where V is the total number of weeks duration (e.g., 52 weeks) used in the regression to calculate u=k×v+b. For example, the predicted gain of the network traffic in percentage may be calculated using the equations (5) or (6) as follows:

$$\text{Gain} = \left[ 2 \times f_{T1}\left(\frac{x'}{2}\right)\bigg|_{0.5x' \leq thr} + 2 \times f_{T2}\left(\frac{x'}{2}\right)\bigg|_{0.5x' > thr} - T_{CR} \right] \times \frac{100\%}{T_{CR}} \quad (5)$$

$$\text{Gain} = \left[ 2 \times f_{T1}\left(\frac{x(1+k'W)}{2}\right) \right.$$

$$\left. \bigg|_{0.5x(1+k'W) \leq thr} + 2 \times f_{T2}\left(\frac{x(1+k'W)}{2}\right)\bigg|_{0.5x(1+k'W) > thr} - T_{CR} \right] \times \frac{100\%}{T_{CR}} \quad (6)$$

where $$k' = \frac{k}{b+k \times V},$$

and V is the total number of weeks duration (e.g., 52 weeks) used in the regression to calculate u=k×v+b. It is notable that, in these equations, the operators of >=and > may be exchangeable and the operators of <=and < may be exchangeable.

Figure 5B:
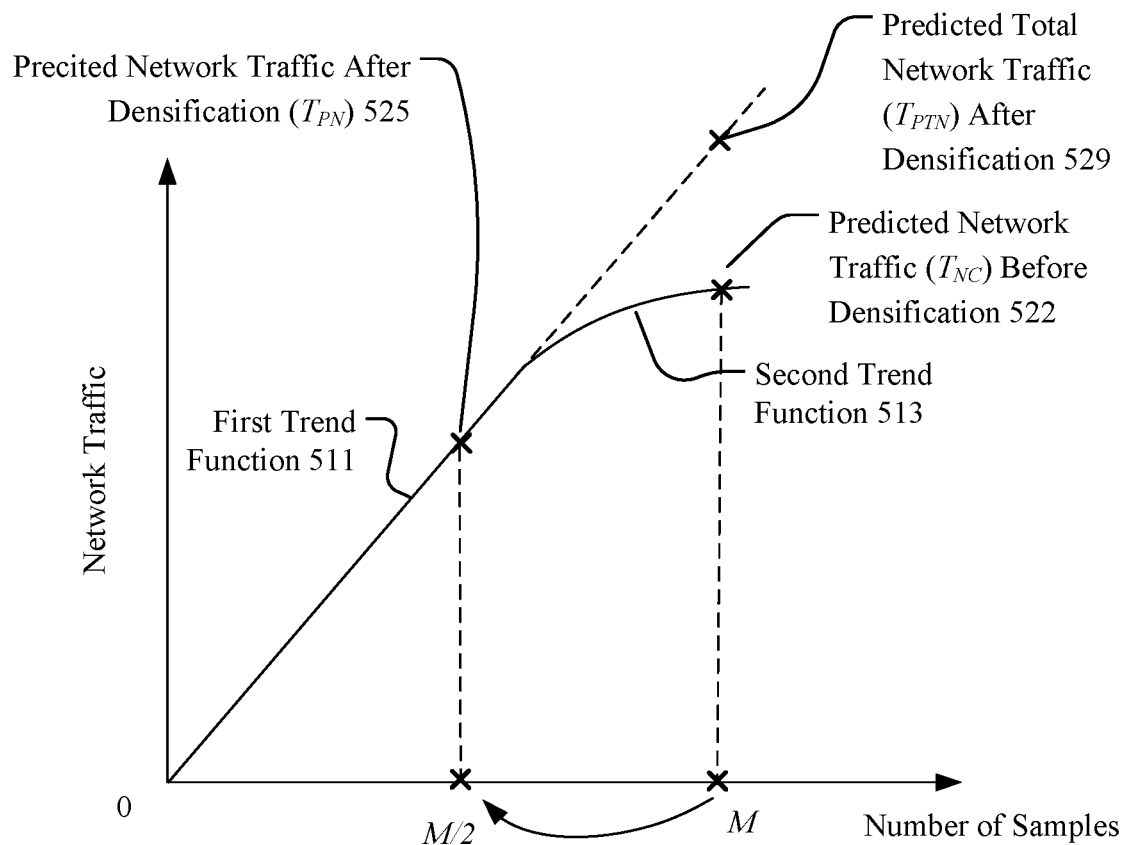
FIG. 5B illustrates an example process for determining predicted network traffic gain for a cell densification operation at a future time.

FIG. 5B illustrates an example process for determining predicted network traffic gain for a cell densification operation at a future time. In particular embodiments, the system may assume a network enhancement operation (e.g., cell densification) to be taken in an area (e.g., a cell) of the communication network at a future time and predict the network enhancement gain based on the network metric trends. As an example and not by way of limitation, the system may use the regression methods as described earlier in this disclosure to determine a first trend function 511 and a second function 513 for the network traffic tends over the number of samples. The trend function 511 may be determined based on a first set of data points (e.g., with number of samples below the splitting threshold) and the trend function 513 may be determined based on a second set of data points (e.g., with number of samples above the splitting threshold). Then, the system may determine the mid/long term trend of number of samples over a period of time (e.g., 28 days, 52 weeks, 1 year or several years) using the methods and processes as illustrated in FIG. 3 and described in earlier sections of this disclosure. The system may determine a predicted number of samples M for the cell of interest at a future time using the mid/long term trend of number of samples (e.g., trends shown in FIG. 3). Then, the system may determine the predicted network traffic $T_{NC}$ 522 before the assumed cell densification based on the trend function 513. After that, the system may determine the predicted number of samples of a single cell (e.g., the existing cell or the newly added cell). The system may assume the cell densification operation includes adding a second cell to improve the network capacity and coverage. For simplification, the system may assume the newly added cell has similar or same network capacity with the existing cell and the network traffic will be split approximately 50%-50% between the exiting cell and the newly added cell. With the assumption of 50%-50% network traffic split between the exiting cell and the newly added cell, the number of samples of a single cell after the densification could be M/2. Then, the system may determine the predicted network traffic $T_{PN}$ 525 after densification for a single cell 525 using the first trend function 511 which is a linear function in this example. Then, the system may determine the precited total network traffic $T_{PTN}$ 519 after the densification which could equal to 2×$T_{PN}$ in this example. Then, the system may calculate the cell densification gain by comparing the predicted network traffic $T_{NC}$ 522 before the cell densification and the precited total network traffic $T_{PTN}$ 529 after the cell densification. The cell densification gain may be determined by subtracting the predicted network traffic $T_{NC}$ 522 before the cell densification from the precited total network traffic $T_{PTN}$ 529 after the cell densification and may be positive gain in this example.

Simplified and Refined Cell Models

In particular embodiments, the system may use a simplified model of the newly added cell for determining network traffic splitting between the existing cell and the newly added cell. Using the simplified model, the system may assume that the newly added cell has similar or same network capacity with the existing cell and the network traffic splitting between them is approximately 50%-50%. In particular embodiments, the system may also consider other factors (e.g., connectivity demand, densification location, distance to current cell, signal strength, interference, communication technologies, etc.) related to the newly added cell to determine a refined model (e.g., by extending the simplified model) of the newly added cell to capture the difference of the newly added cell from the existing cell. For example, the newly added cell may have different network capacity from the existing cell when it is added to different locations. As another example, the newly added cell may have greater network capacity by avoiding signal interference. In particular embodiments, network traffic splitting between the existing cell and the newly added cell may be any possible proportion of X % and (100–X)%, where X could be any number in the range of [0, 100] based on the refined cell model of the newly added cell. The system may determine the predicted network traffic after cell densification based on network traffic splitting percentage (e.g., X % and (100–X)%) as determined by the refined cell model.

Download Speed Gain Prediction

Regression Based Download Speed Prediction

In particular embodiments, the system may predict the network speed gain of a cell densification operation based on network speed trends using similar methods and processes for predicting network traffic gain as described in earlier section of this disclosure. The network speed may be download speed, upload speed, round-way communication speed, network latency, or any network speed related metrics. The system may determine the cell download speed based on the download speed measured from the end user application perspective or from infrastructure perspective. The system may generate a series of data points aggregated per hour per week and perform regression on these data points to determine the download speed trend with respect to the number of samples. In particular embodiments, the trend of the download speed over the number of samples may include a flat curve portion and a bending curve portion. When the number of samples falls within the range corresponding to the flat curve portion, the download speed may be approximately constant when the number of samples increases. When the number of samples falls within the range corresponding to bending curve portion, the download speed may start to decrease when the number of samples increases. This may indicate that number of samples has become too large and, due to the network capacity limitation, some of users' QoE may be negatively impacted with reduced download speed.

Figure 6A:
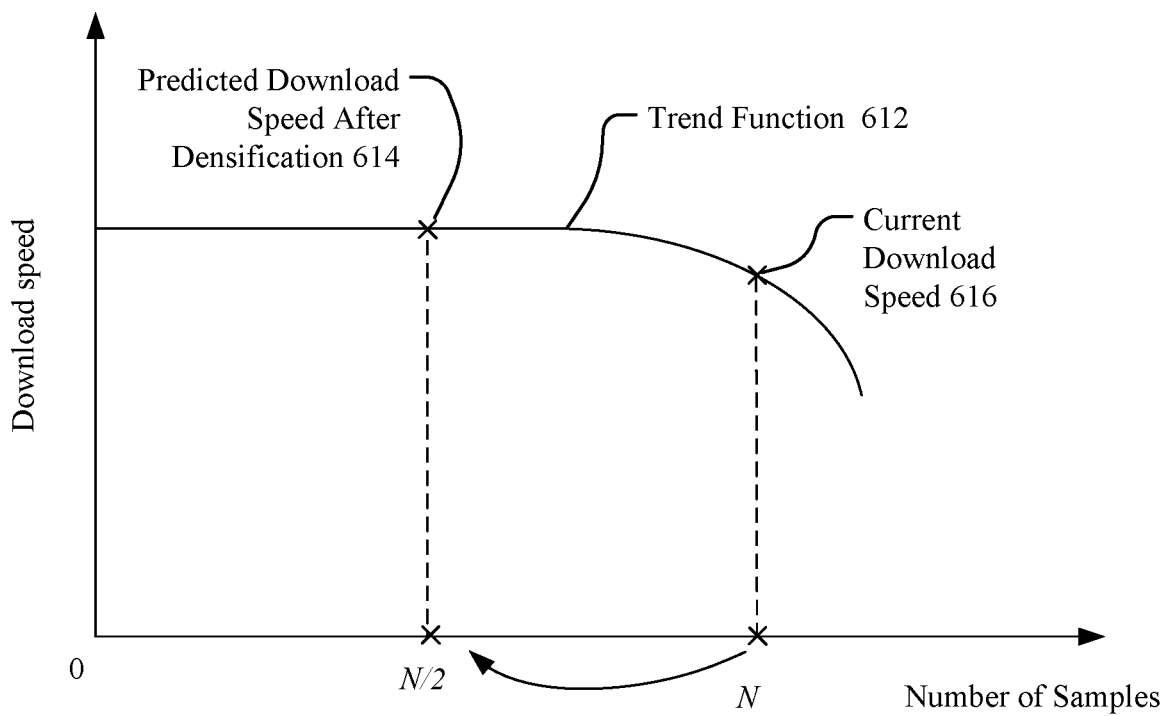
FIG. 6A illustrates an example process for predicting download speed gain for a cell densification at current time.

FIG. 6A illustrates an example process for predicting download speed gain for a cell densification at current time. In particular embodiments, the system may determine (e.g., using non-linear regression) an overall trend function 612 of the download speed based on the aggregated data points. In particular embodiments, the system may split the aggregated data points into two or more sets of data points using a threshold value of number of samples (e.g., 50-percentile threshold or median value of the number of samples). The system may determine a first trend function of the download speed based on the first set of data points (with numbers of samples below the threshold) and determine a second function trend of the download speed based on the second set of data points (with number of samples above the threshold). The first and second trend may be determined based on linear regression or non-linear regression. The overall trend function 612 may be determined based on the first and second trend functions. Then, the system may determine the current value of number of samples N and the current download speed 612 based on measured download speed at application level or/and infrastructure level. The system may calculate the predicted download speed based on the determined download speed trend function 612. The system may assume that the newly added cell has the same or similar network capacity with the currently exiting cell and determine that the network traffic splits between the newly added cell and the currently existing cell equally (e.g., 50%-50% split). The number of sample of a single cell (either the existing cell or the newly added cell) could be N/2 after the cell densification. The system may determine the predicted download speed after the cell densification 614 based on the trend function 612 and the number of sample of a single cell (e.g., N/2) after cell densification. The system may determine the download speed gain of the cell densification by comparing the predicted download speed after densification 614 (of the current existing cell or the newly added cell) with the current download speed 616 without the cell densification. The download speed gain of the cell densification may be determined by subtracting the current download speed 616 without the cell densification from the predicted download speed after densification 614 (of the current existing cell or the newly added cell).

Figure 6B:
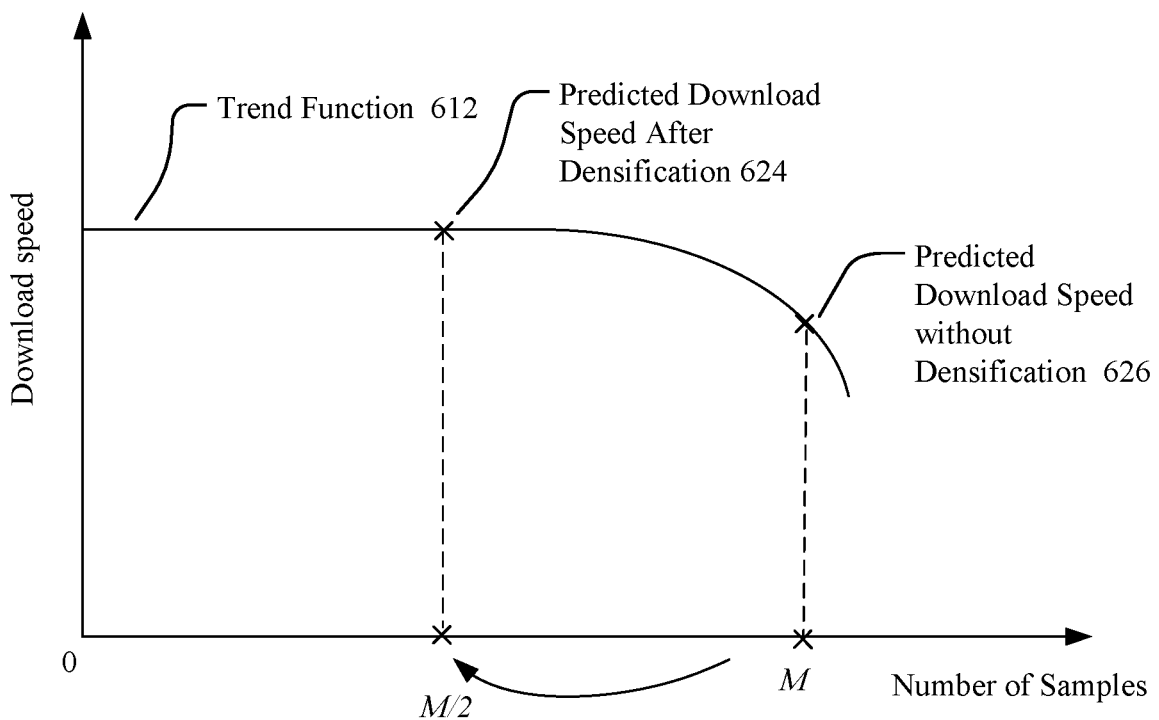
FIG. 6B illustrates an example process for predicting download speed gain for a cell densification at a future time.

FIG. 6B illustrates an example process for predicting download speed gain for a cell densification at a future time. In particular embodiments, the system may predict the download speed gain for a cell densification supposed to happen at a future time based on the download speed trends and predicted number of samples at that future time. In particular embodiments, the system may determine a mid/long term trend of the number of samples based on regression of the determined data points as illustrated in FIG. 3. The system may predict the value of the number of samples M for a future time (e.g., 1 year later) based on the determined mid/long term tend and the current number of sample value. Then, the system may predict the download speed at that future time based on the download speed trend 612 and the predicted number of samples M of that future time assuming the cell densification happens at that future time. The system may assume that the newly added cell has the same or similar network capacity with the currently exiting cell and assume that the network traffic splits between the newly added cell and the currently existing cell equally (e.g., about 50%-50% split). The number of sample of a single cell (either the existing cell or the newly added cell) could be M/2 after the cell densification. The system may determine the predicted download speed after the cell densification 624 based on the download speed trend 612 and the number of samples after densification (e.g., M/2). The system may determine the download speed gain of the cell densification by comparing the predicted download speed 624 after the assumed densification 624 (of the existing cell and the newly added cell) with the predicted download speed 626 without the cell densification. The download speed gain of the cell densification may be determined by subtracting the current download speed 626 without the cell densification from the predicted download speed after densification 624 (of the current existing cell or the newly added cell). When the predicted download speed 626 at that future time without cell densification is lower than the current download speed 616 (because the increase of the number of samples in the bending curve range), the cell densification of the future time may have a larger download speed gain than the cell densification of current time.

Weighted Average Method

In particular embodiments, the system may calculate the predicted download speed gain using the regression-based methods similar to the methods and process for predicting network traffic gain prediction as described earlier in this disclosure. In particular embodiments, the system may use a weighted average method to calculate the predicted download speed gain of cell densification without performing regression. The system may not differentiate the gain of the densification at current time or at a future time (e.g., W weeks from now). The system may determine a threshold for the number of samples to directly split the data points into two data sets based on the number of samples. For example, the system may use 0.5 times of the maximum number of samples as the splitting threshold, as described in the following equation:

$$T_{NS}=0.5\times \max(x) \quad (7)$$

where, $T_{NS}$ is the number of sample threshold and x is the number of samples for each data point. As another example, the system may determine the number of sample threshold based on the maximum value, the average value, and the stand deviation value of the number of samples, as described in the following equation:

$$T_{NS}=0.5\times \min[\max(x),\text{avg}(x)+3\times \text{std}(x)] \quad (8)$$

where, $T_{NS}$ is the number of sample threshold, avg(x) is the average value of the all number of sample values, std(x) is the standard deviation of all number of sample values. Equation (8) may minimize the impact of some outlier data points which may have a value that is really far away from the other data points.

FIG. 7 illustrates an example process for predicting download speed gain using a weighted average method. The system may use a threshold $T_{NS}$ 708 to split the aggregated data points into a first set of data points 702 and a second set of data points 704. The splitting threshold $T_{NS}$ may be determined using the equation (7) or (8) based on the maximum number of samples 706. Then, the system may identify the first set of data points with the number of sample values below the threshold as the data points after densification and identify the second set of data points with number of sample values above the threshold as the data points before the densification. Then, the system may calculate a weighted average download speed of all the data points using the number of samples as the weights, as described in the following equation:

$$S_{WA} = \frac{SUM(x \times S_x)}{SUM(x)} \; x \in \{\text{all data points}\} \qquad (9)$$

where SUM means adding all the elements together, $S_x$ is the download speed of each data point, x is the number of samples of each data point, and $S_{WA}$ is the weighted average download speed of all the data points. Then, the system may calculate the weighted average download speed for the data points whose numbers of samples are below the threshold using the following equation:

$$S_{WB} = \frac{SUM(x \times S_x)}{SUM(x)} \; x \in \{\text{data points with numbers of sample} < \text{threshold}\} \qquad (10)$$

After that, the system may determine the cell densification gain based on the weighted average download speed of all data points and the weighted average download speed of the data points with numbers of samples below the splitting threshold. The gain for the cell densification may be calculated by the following equations:

$$\text{Gain} = S_{WB} - S_{WA} \qquad (11)$$

$$\text{Gain} = (S_{WB} - S_{WA}) \times 100\% / S_{WA} \qquad (12)$$

Network Optimization and Recommendations

Identifying Optimization Sites

In particular embodiments, the system may identify one or more areas of interest or sites of interest for network optimization or enhancement to improve the user QoE in these areas. A geographic area of interest or site of interest may include one or more cells of the communication network. For example, the system may identify a cell with high network traffic (e.g., being above a network traffic threshold) as a geographic area of interest for optimization. As another example, the system may identify an area covering two or more cells with low network speed (e.g., download speed being below a download speed threshold) as a geographic area of interest for optimization. As another example, the system may identify an area covering one or more cells with high number of samples (e.g., number of samples being above a threshold) as a geographic area of interest for optimization. As another example, the system may identify an area covering one or more cells with network congestion as a geographic area of interest. U.S. patent application Ser. No. 16/155,510, entitled "Detecting Communication Network Insights of Alerts," filed on 9 Oct. 2018, which is incorporated by reference as an example only and not by way of limitation, discloses examples of detecting network congestion of a communication network. U.S. patent application Ser. No. 16/226,477, entitled "Detecting Communication Network Insights of Alerts," filed on 19 Dec. 2018, which is incorporated by reference as another example only and not by way of limitation, discloses examples of detecting network congestion of a communication network.

In particular embodiments, the system may identify one or more cells for network optimization or enhancement based on QoE scores associated with the cells. The QoE scores may be determined based on one or more network metrics (e.g., network traffic, network speed, number of samples, network congestion, etc.) or a weighted sum of two or more network metrics. The system may rank the cells of the communication network according to the QoE scores or one or more network metrics and identify a top N number of cells (N can be any positive integer number) or a top X percentage of the cells (X can by any number from 0 to 100) for cell optimization. For example, the system may identify the top 5 cells with highest network traffic as the cells to be optimized. As another example, the system may identify the top 5 cells with the worst busy hour download speed as the cells to be optimized. As another example, the system may identify the top 5 cells with worst download speed of all hours as the cells to be optimized.

In particular embodiments, the system may predict the cell enhancement gain for one or more potential or possible cell enhancement operations for a number of areas covered by the communication network and identify the areas (e.g., a cell) for network optimization or enhancement based at least in part on the predicted cell enhancement gain. In particular embodiments, the system may generate one or more cell optimization or enhancement recommendations (e.g., cell densification, cell upgrading) for the identified areas based on at least one the predicted cell enhancement gain. For example, the system may identify the top 5 cells with highest percentage of download speed gain and generate cell enhancement recommendations for these cells. As another example, the system may identify top 5 cells of highest gain of predicted network traffic increase and generate network enhancement recommendations for these cells.

In particular embodiments, the system may use a filter identify the cells of interest for generating cell enhancement recommendations. The system may filter the cells based on the QoE scores which may be a weighted sum of two or more network metrics. The system may use "OR" or/and "AND" operations to accommodate multiple conditions for identifying cells for optimization. For example, the system may identify the cells for optimization with the conditions of "5 worst download speed cells" OR "5 highest predicted download speed increase cells" OR "5 highest predicted network traffic increase cells". As another example, the system may identify the cells for optimizations with the conditions of "5% worst download speed cells" AND "highest 5% precited download speed increase cells". Alternatively, the system may allow the MNOs to manually select one or more cells of interest for optimization.

Network Optimization Recommendations

In particular embodiments, the system may generate recommendations for one or more network optimization or enhancement recommendations (e.g., cell densification, upgrading capacity, moving to 4G/5G, tuning cellular towers, tuning antenna angles, adding more sectors, adding fiber links, strengthening fiber backhaul) for one or more areas or sites based at least in part on the predicted network enhancement gain in these areas. The system may predict the gain and effectiveness of the network optimizations/enhancements from the user QoE perspective before the optimization and may evaluate the actual gain and effectiveness after the optimization. Then, the system may rank the areas of interest based on the predicted network enhancement gain and the corresponding network enhancement operations. The system may generate network enhancement recommendations based on the prioritization scores of the areas of interest and the related network enhancement operations.

For example, the system may provide network optimization recommendations on whether to optimize the network in particular areas (e.g., high network traffic areas), which aspects to optimize for (e.g., network upgrading, network expansion, adding more cells, cell densification), where and when exactly to optimize (e.g., where and when to add cells for cell densification), what is the predicted gain, etc.

In particular embodiments, the system may perform network optimization (e.g., at platform level, infrastructure level, device level, or application level) based on one or more network optimization recommendations. The system may optimize the communication (e.g., infrastructure level, application level) based on information from multiple layers of the system (e.g., both infrastructure level and application level) instead of information from one single layer only (e.g., infrastructure level only or application level only) to improve network performance. In particular embodiments, the system may generate network optimization plans for long term optimization (e.g., cell densification, upgrading network to 4G/5G, adding fibers, strengthening fiber backhaul) or short-term optimization planning (e.g., tune tower antenna angles, balancing demands and capacity) based on the predicted network enhancement gain. In particular embodiments, the optimization recommendation may be generated using a machine-learning (ML) model which is trained based on historical data.

In particular embodiments, the system may provide supporting and feedback information to the network optimization (e.g., at infrastructure level) based on the collected application data. In particular embodiments, the system may detect network coverage and capacity issues of cells at large scale and predict enhancement gain in these cells in large scale. The system may provide more effective network optimization recommendations with reduced cost for improving the network performance and end users' QoE. For example, the system may optimize network infrastructure more effectively (e.g., upgrading capacity, tuning cellular towers, adding cells, adding fiber links) and provide better QoE (e.g., higher network speed, less network traffic, less network latency) to end users of the networks. The system may reduce the operating expense (OPEX) (e.g., via reducing the complaints, tickets, lowering the network optimization cost), reduce the CAPEX (e.g., via most effectively pinpoint out where to add more cells and avoid adding cells in non-needed places), and recover or boost the traffic volume which would have been suppressed due to unsatisfied QoE.

User Interfaces

Network Enhancement Gain Prediction UI

Figure 8:
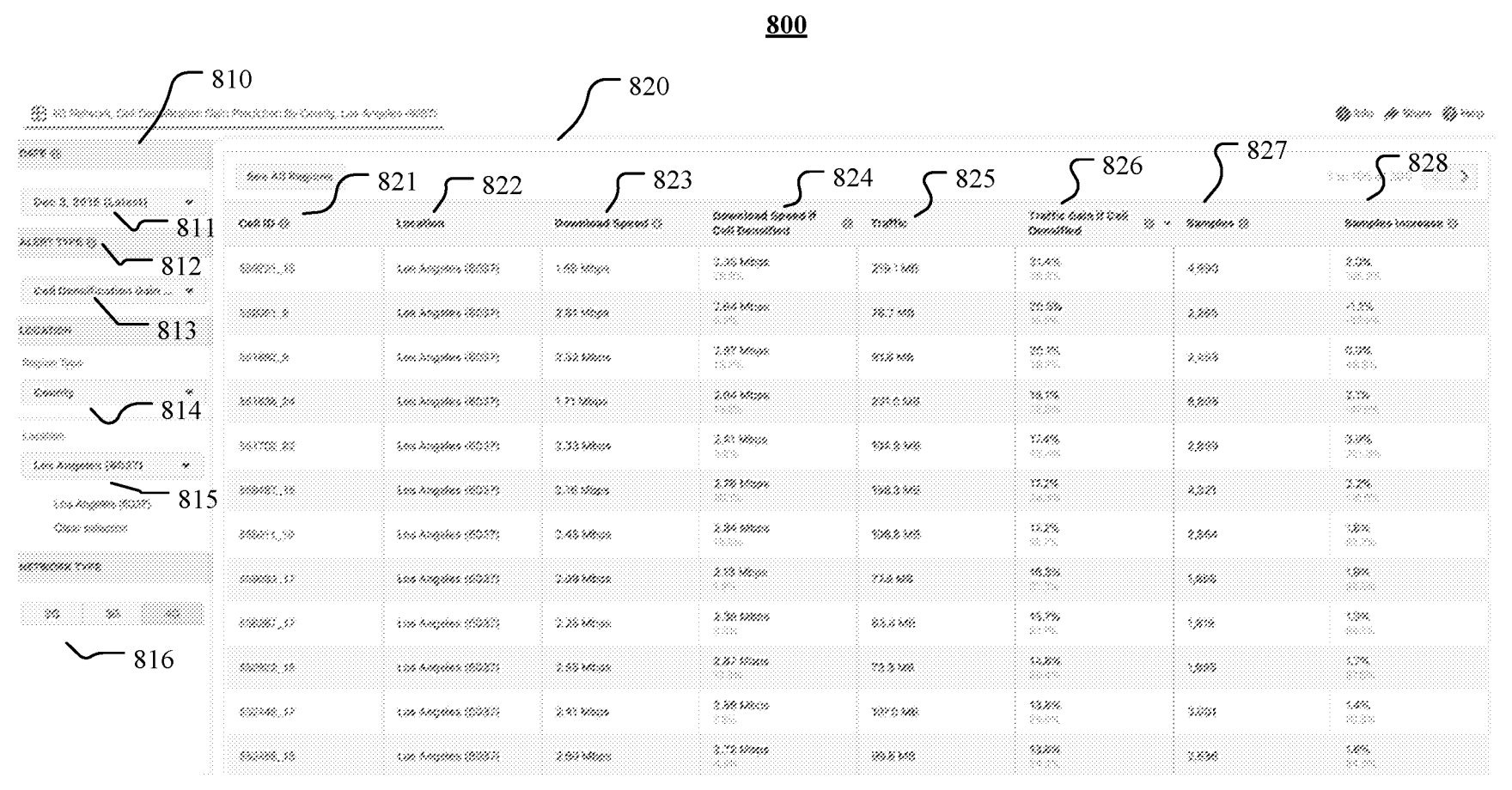

FIG. 8 illustrates an example user interface 800 for predicting cell densification gain and displaying prediction results. In particular embodiments, the user interface 800 of the system may include a table 820 which may include a cell in each row. The columns of the table 820 may correspond to cell attributes, network metrics, predicted network metric gain, etc. For example, the columns of the table 820 may display, one in each column, cell identification 821, location 822, download speed 823, predicted download speed after cell densification 824, network traffic 825, predicted network traffic after densification 826, number of samples 827, number of samples increase 828, etc. In particular embodiments, the system may automatically rank the cells based on one or more network metrics (e.g., download speed, network traffic, number of samples) or one or more predicted cell enhancement gain (e.g., network traffic gain, download speed gain, increase of number of samples) and generate network optimization recommendations based on the ranking results. In particular embodiments, the system may allow users of the system (e.g., MNOs) to manually select cells for generating optimization recommendations. In particular embodiments, the user interface 800 may include a setting panel 810 for users to select or/and configure the cells to be analyzed and the results to be displayed. Then panel 810 may include a number of drop-down menus for configuring the date 811, the alert type 812 (e.g., cell densification gain prediction 813), the region type 814, the location 815, the network type 816 (e.g., 2G, 3G, 4G), etc.

Example Method

Figure 9:
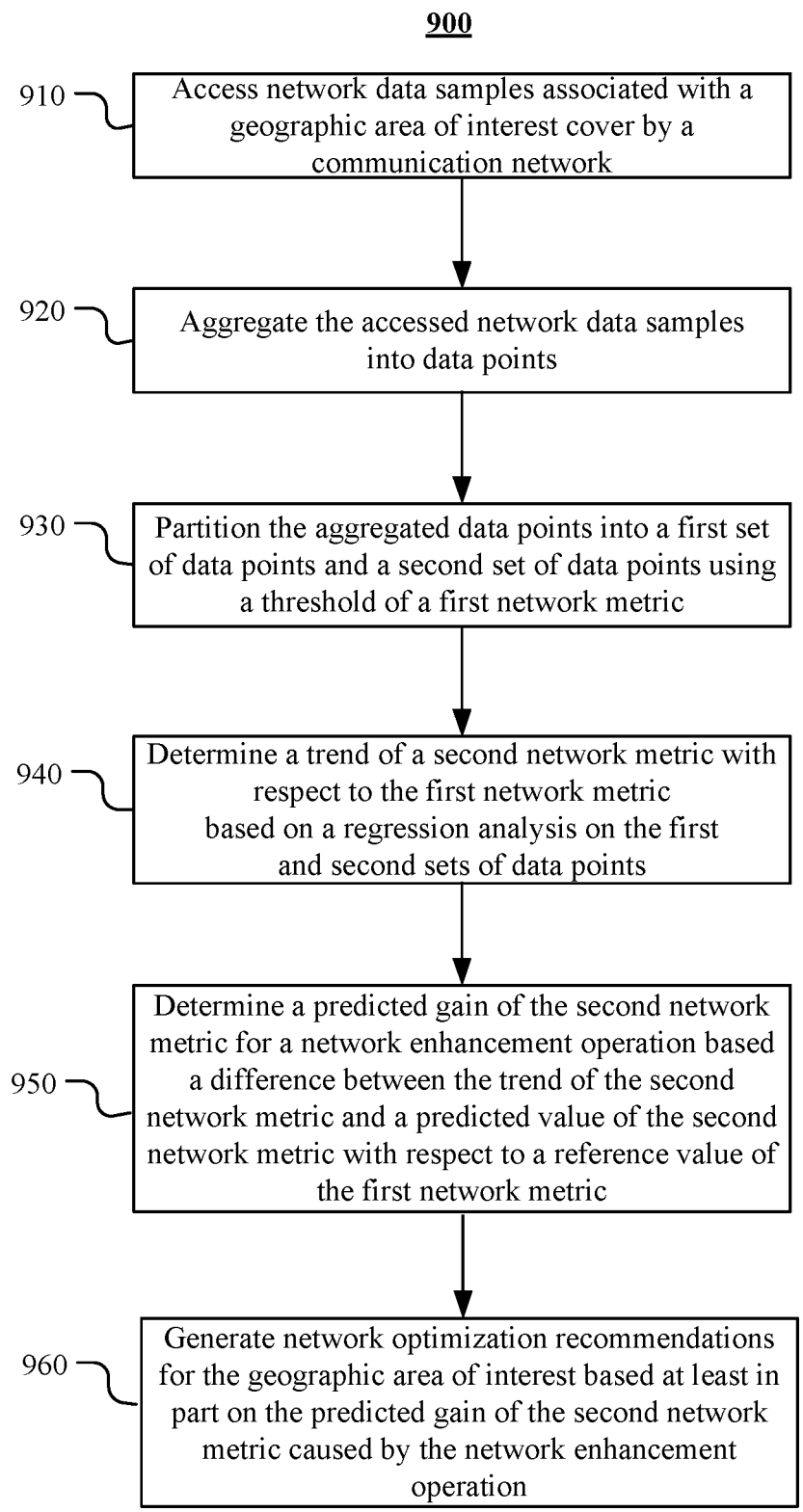
FIG. 9 illustrates an example method of predicting cell enhancement gain of a geographic area of interest and generating network optimization recommendations based on the predicted cell enhancement gain.

FIG. 9 illustrates an example method of predicting cell enhancement gain of a geographic area of interest and generating network optimization recommendations based on the predicted cell enhancement gain. The method may begin at Step 910, where in the system may collect or access network data (e.g., data samples) associated with a geographic area of interest covered by a communication network. The network data may be collected at application level (e.g., from social network applications, network operator applications, carrier applications, third-party applications, or any suitable applications, etc.) or at infrastructure level (e.g., from servers, routers, cell towers, network instrumentations, etc.). The collected network data may include information related to network traffic, download speed, number of samples, time, etc. The geographic area of interest may include one or more cells of the communication network. At Step 920, the system may aggregate the collected or accessed data samples into a number of data points. For example, the data points may be aggregated per hour per N days where N can be any positive integer (e.g., 7 days, 28 days). As another example, the data points may be aggregated per hour per week. The aggregated data points may correlate a first network metric (e.g., network traffic, download speed, number of samples) to a second network metric or parameter (e.g., number of samples, time).

At Step 930, the system may split or partition the aggregated data points into a first set of data points and a second set of data points using a first threshold of a first network metric. The first set of data point may be below the first threshold of the first network metric corresponding to non-busy hours of the communication network. The second set of data points may be above the first threshold of the first network metric corresponding to busy hours of the communication network. In particular embodiments, the first threshold of the first network metric may be a 50-percentile threshold of the first network metric. In particular embodiments, the first threshold of the first network metric may be median value threshold of the first network metric. At Step 940, the system may determine a trend of a second network metric with respect to the first network metric based on a regression analysis of the first and second sets of data points. In particular embodiments, the first network metric may be number of samples and the second network metric may be network traffic. In particular embodiments, the first network metric may be number of samples and the second network metric may be download speed. In particular embodiments, the trend of the second network metric over the first network metric may be determined based on a first trend function and a second trend function. The first trend function may be determined based on a first regression on the first set of data points. The second trend function may be determined based on a second regression on the second set of data points. The first and second regression may be linear regression or non-linear regression.

At Step 950, the system may determine a predicted gain of the second network metric for a network enhancement operation based on a difference between the trend of the second network metric and a predicted value of the second network metric (e.g., predicted total network traffic) after the network enhancement operation with respect to a reference value of the first network metric. The system may determine a predicted value of the first network metric after the network enhancement operation based on a simplified cell model. Then, the system may determine an intermediate predicted value of the second network metric (e.g., predicted network traffic of a single cell) after the network enhancement operation based on the trend of the second network metric and the predicted value of the first network metric after the network enhancement operation. After that, the system may determine a predicted total value of the second network metric of the geographic area of interest after the network enhancement operation based on the intermediate predicted value of the second network metric after the network enhancement operation. For network traffic, the predicted total value may be the total network traffic of the existing cell and the newly added cell after the cell densification and can be determined by doubling the network traffic of the existing cell or the newly added cell after the cell densification. For download speed, the predicted total value may be the download speed of the existing cell or the newly added cell after the cell densification. In particular embodiments, the reference value of the first network metric may be measured value of the first network metric at current time. The predicted gain of the second network metric may be determined by comparing the predicted total value of the second network metric after the network enhancement operation to a current value of the second network metric before the network enhancement operation. In particular embodiments, the system may determine a mid-term or long-term trend of the first network metric over a period of time. Then, the system may determine a first predicted future value of the first network metric of a future time based on the mid-term or long-term trend of the first network metric. After that, the system may determine a second predicted future of the second network metric of the future time based on the first predicted future value of the first network metric of the future time. The reference value of the first network metric may be a predicted future value of the first network metric of the future time. The predicted gain of the second network metric may be determined by comparing the predicted total value of the second network metric after the network enhancement operation at the future time to the second predicted value of the second network metric before the network enhancement operation of the future time. In particular embodiments, the network enhancement operation may include adding a new cell in the geographic area of interest. The system may assume the network traffic is equally split between an existing cell and the new cell based using a simplified cell model.

At Step 960, the system may generate one or more network optimization recommendations for the geographic area of interest based at least in part on the predicted gain of the second network metric caused by the network enhancement operation. The system may optimize the communication network in the geographic area of interest based on the one or more network optimization recommendations. In particular embodiments, the system may split the aggregated data points into the first set of data points and the second set of data points using a second threshold of the first network metric. The first set of data point may be below the second threshold of the first network metric. The system may determine a first weighted average of the second network metric based on all of the data points comprising the first and second sets of data points and determine a second weighted average of the second network metric based on the first set of data points. The system may determine the predicted gain of the second network metric by comparing the first and second weighted average of the second network metric. In particular embodiments, the second threshold of the first network metric may equal to 0.5 times of a maximum value of the first network metric.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for predicting cell enhancement gain of a geographic area of interest and generating network optimization recommendations based on the predicted cell enhancement gain including the particular steps of the method of FIG. 9, this disclosure contemplates any suitable method for predicting cell enhancement gain of a geographic area of interest and generating network optimization recommendations based on the predicted cell enhancement gain including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

System Overview

Figure 10:
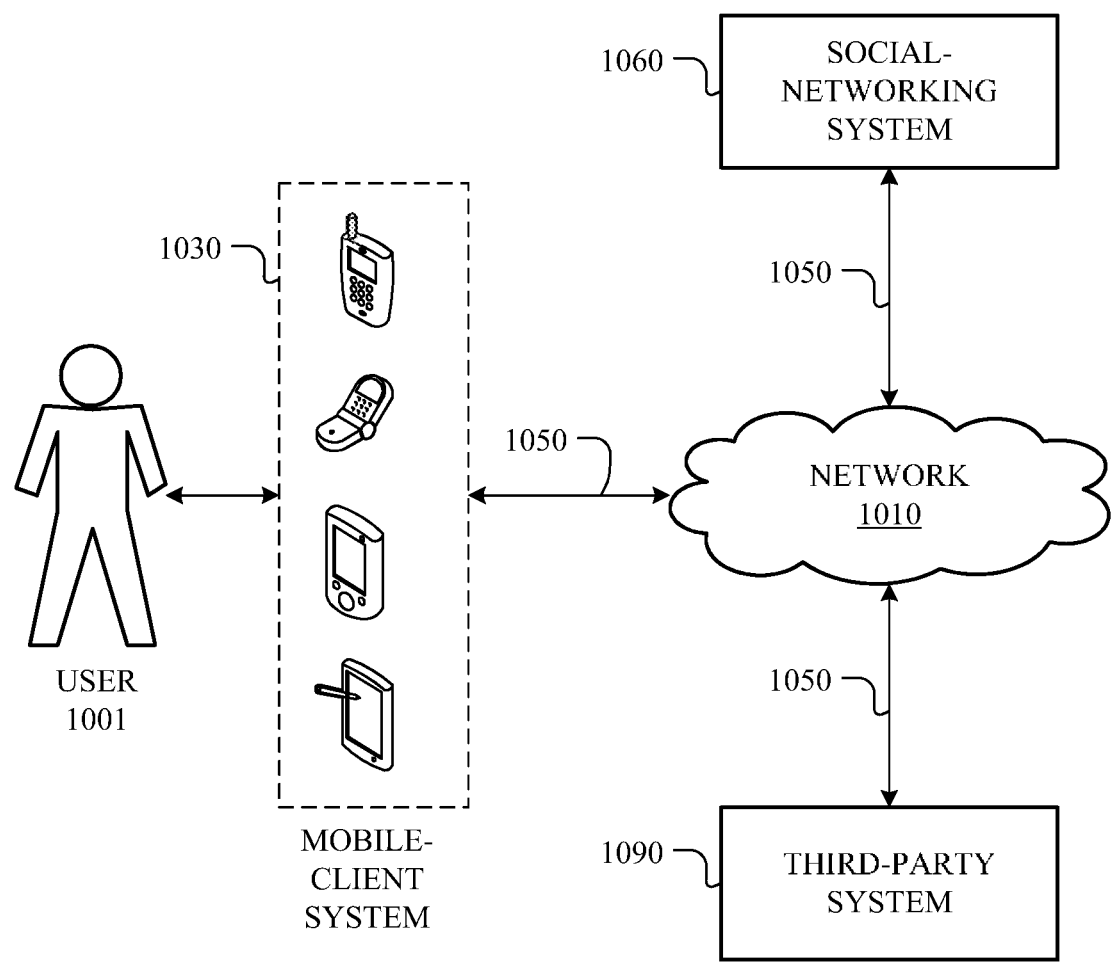
FIG. 10 illustrates an example network environment associated with a social-networking system.

FIG. 10 illustrates an example network environment 1000 associated with a social-networking system. Network environment 1000 includes a client system 1030, a social-networking system 1060, and a third-party system 1070 connected to each other by a network 1010. Although FIG. 10 illustrates a particular arrangement of client system 1030, social-networking system 1060, third-party system 1070, and network 1010, this disclosure contemplates any suitable arrangement of client system 1030, social-networking system 1060, third-party system 1070, and network 1010. As an example and not by way of limitation, two or more of client system 1030, social-networking system 1060, and third-party system 1070 may be connected to each other directly, bypassing network 1010. As another example, two or more of client system 1030, social-networking system 1060, and third-party system 1070 may be physically or logically co-located with each other in whole or in part. Moreover, although FIG. 10 illustrates a particular number of client systems 1030, social-networking systems 1060, third-party systems 1070, and networks 1010, this disclosure contemplates any suitable number of client systems 1030, social-networking systems 1060, third-party systems 1070, and networks 1010. As an example and not by way of limitation, network environment 1000 may include multiple client system 1030, social-networking systems 1060, third-party systems 1070, and networks 1010.

This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

In particular embodiments, client system 1030 may be an electronic device including hardware, software, or embedded logic components or a combination of two or more such components and capable of carrying out the appropriate functionalities implemented or supported by client system 1030. As an example and not by way of limitation, a client system 1030 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1030. A client system 1030 may enable a network user at client system 1030 to access network 1010. A client system 1030 may enable its user to communicate with other users at other client systems 1030.

In particular embodiments, client system 1030 may include a web browser 1032, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1030 may enter a Uniform Resource Locator (URL) or other address directing the web browser 1032 to a particular server (such as server 1062, or a server associated with a third-party system 1070), and the web browser 1032 may generate a Hyper Text Transfer Protocol (HTTP) request and communicate the HTTP request to server. The server may accept the HTTP request and communicate to client system 1030 one or more Hyper Text Markup Language (HTML) files responsive to the HTTP request. Client system 1030 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 1060 may be a network-addressable computing system that can host an online social network. Social-networking system 1060 may generate, store, receive, and send social-networking data, such as, for example, user-profile data, concept-profile data, social-graph information, or other suitable data related to the online social network. Social-networking system 1060 may be accessed by the other components of network environment 1000 either directly or via network 1010. As an example and not by way of limitation, client system 1030 may access social-networking system 1060 using a web browser 1032, or a native application associated with social-networking system 1060 (e.g., a mobile social-networking application, a messaging application, another suitable application, or any combination thereof) either directly or via network 1010. In particular embodiments, social-networking system 1060 may include one or more servers 1062. Each server 1062 may be a unitary server or a distributed server spanning multiple computers or multiple datacenters. Servers 1062 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1062 may include hardware, software, or embedded logic components or a combination of two or more such components for carrying out the appropriate functionalities implemented or supported by server 1062. In particular embodiments, social-networking system 1060 may include one or more data stores 1064. Data stores 1064 may be used to store various types of information. In particular embodiments, the information stored in data stores 1064 may be organized according to specific data structures. In particular embodiments, each data store 1064 may be a relational, columnar, correlation, or other suitable database. Although this disclosure describes or illustrates particular types of databases, this disclosure contemplates any suitable types of databases. Particular embodiments may provide interfaces that enable a client system 1030, a social-networking system 1060, or a third-party system 1070 to manage, retrieve, modify, add, or delete, the information stored in data store 1064.

In particular embodiments, social-networking system 1060 may store one or more social graphs in one or more data stores 1064. In particular embodiments, a social graph may include multiple nodes—which may include multiple user nodes (each corresponding to a particular user) or multiple concept nodes (each corresponding to a particular concept)—and multiple edges connecting the nodes. Social-networking system 1060 may provide users of the online social network the ability to communicate and interact with other users. In particular embodiments, users may join the online social network via social-networking system 1060 and then add connections (e.g., relationships) to a number of other users of social-networking system 1060 to whom they want to be connected. Herein, the term "friend" may refer to any other user of social-networking system 1060 with whom a user has formed a connection, association, or relationship via social-networking system 1060.

In particular embodiments, social-networking system 1060 may provide users with the ability to take operations on various types of items or objects, supported by social-networking system 1060. As an example and not by way of limitation, the items and objects may include groups or social networks to which users of social-networking system 1060 may belong, events or calendar entries in which a user might be interested, computer-based applications that a user may use, transoperations that allow users to buy or sell items via the service, interoperations with advertisements that a user may perform, or other suitable items or objects. A user may interact with anything that is capable of being represented in social-networking system 1060 or by an external system of third-party system 1070, which is separate from social-networking system 1060 and coupled to social-networking system 1060 via a network 1010.

In particular embodiments, social-networking system 1060 may be capable of linking a variety of entities. As an example and not by way of limitation, social-networking system 1060 may enable users to interact with each other as well as receive content from third-party systems 1070 or other entities, or to allow users to interact with these entities through an application programming interfaces (API) or other communication channels.

In particular embodiments, a third-party system 1070 may include one or more types of servers, one or more data stores, one or more interfaces, including but not limited to APIs, one or more web services, one or more content sources, one or more networks, or any other suitable components, e.g., that servers may communicate with. A third-party system 1070 may be operated by a different entity from an entity operating social-networking system 1060. In particular embodiments, however, social-networking system 1060 and third-party systems 1070 may operate in conjunction with each other to provide social-networking services to users of social-networking system 1060 or third-party systems 1070. In this sense, social-networking system 1060 may provide a platform, or backbone, which other systems, such as third-party systems 1070, may use to provide social-networking services and functionality to users across the Internet.

In particular embodiments, a third-party system 1070 may include a third-party content object provider. A third-party content object provider may include one or more sources of content objects, which may be communicated to a client system 1030. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1060 also includes user-generated content objects, which may enhance a user's interoperations with social-networking system 1060. User-generated content may include anything a user can add, upload, send, or "post" to social-networking system 1060. As an example and not by way of limitation, a user communicates posts to social-networking system 1060 from a client system 1030. Posts may include data such as status updates or other textual data, location information, photos, videos, links, music or other similar data or media. Content may also be added to social-networking system 1060 by a third-party through a "communication channel," such as a newsfeed or stream.

In particular embodiments, social-networking system 1060 may include a variety of servers, sub-systems, programs, modules, logs, and data stores. In particular embodiments, social-networking system 1060 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1060 may also include suitable components such as network interfaces, security mechanisms, load balancers, failover servers, management-and-network-operations consoles, other suitable components, or any suitable combination thereof. In particular embodiments, social-networking system 1060 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1060 to one or more client systems 1030 or one or more third-party system 1070 via network 1010. The web server may include a mail server or other messaging functionality for receiving and routing messages between social-networking system 1060 and one or more client systems 1030. An API-request server may allow a third-party system 1070 to access information from social-networking system 1060 by calling one or more APIs. An action logger may be used to receive communications from a web server about a user's operations on or off social-networking system 1060. In conjunction with the action log, a third-party-content-object log may be maintained of user exposures to third-party-content objects. A notification controller may provide information regarding content objects to a client system 1030. Information may be pushed to a client system 1030 as notifications, or information may be pulled from client system 1030 responsive to a request received from client system 1030. Authorization servers may be used to enforce one or more privacy settings of the users of social-networking system 1060. A privacy setting of a user determines how particular information associated with a user can be shared. The authorization server may allow users to opt in to or opt out of having their operations logged by social-networking system 1060 or shared with other systems (e.g., third-party system 1070), such as, for example, by setting appropriate privacy settings. Third-party-content-object stores may be used to store content objects received from third parties, such as a third-party system 1070. Location stores may be used for storing location information received from client systems 1030 associated with users. Advertisement-pricing modules may combine social information, the current time, location information, or other suitable information to provide relevant advertisements, in the form of notifications, to a user.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their operations logged by social-networking system 1060 or shared with other systems (e.g., third-party system 1070). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1070, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 1062 may be authorization/privacy servers for enforcing privacy settings. In response to a request from a user (or other entity) for a particular object stored in a data store 1064, social-networking system 1060 may send a request to the data store 1064 for the object. The request may identify the user associated with the request and may only be sent to the user (or a client system 1030 of the user) if the authorization server determines that the user is authorized to access the object based on the privacy settings associated with the object. If the requesting user is not authorized to access the object, the authorization server may prevent the requested object from being retrieved from the data store 1064, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 11:
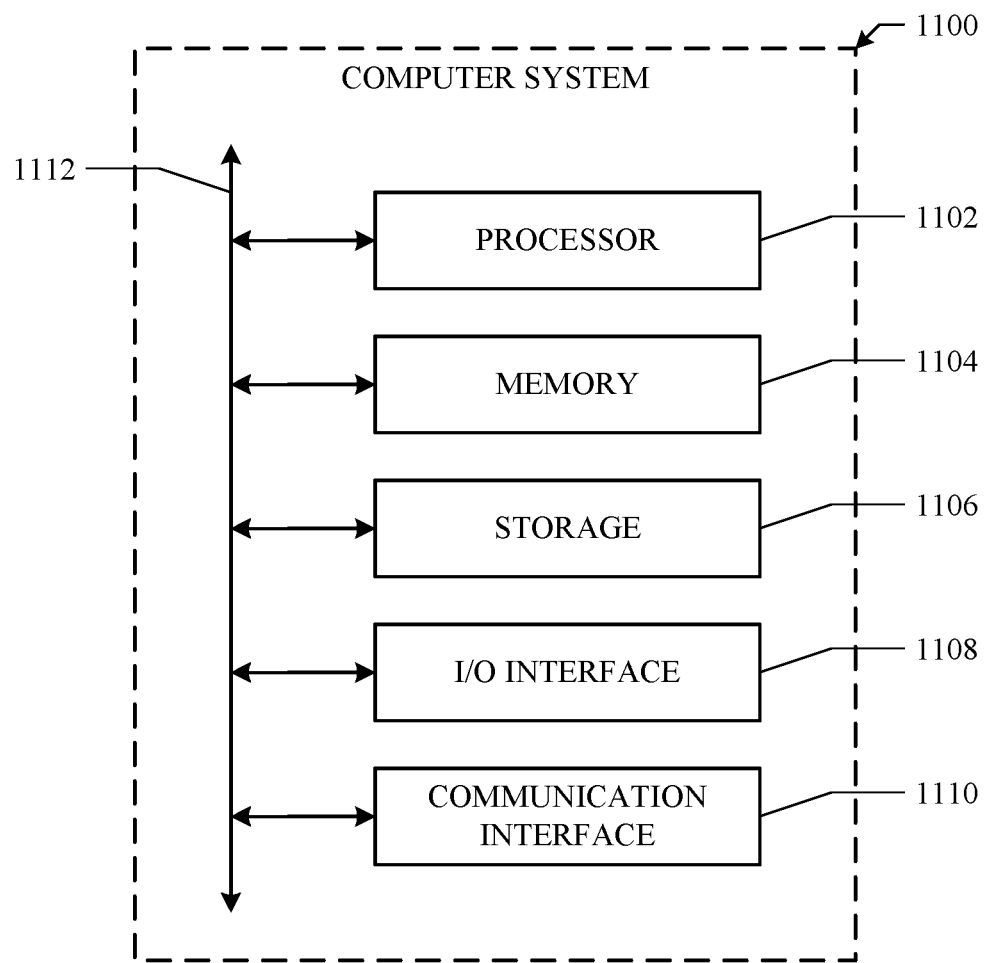
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    accessing data samples associated with a geographic area of interest covered by a communication network, wherein the data samples are aggregated into a plurality of data points;
    partitioning the plurality of data points into a first set of data points and a second set of data points using a first threshold of a first network metric;
    determining a trend of a second network metric with respect to the first network metric based on a regression analysis of the first and second sets of data points;
    determining a predicted gain of the second network metric for a network enhancement operation, wherein the predicted gain of the second network metric is determined based on a difference between the trend of the second network metric and a predicted value of the second network metric after the network enhancement operation with respect to a reference value of the first network metric; and
    generating one or more network optimization recommendations for the geographic area of interest based at least in part on the predicted gain of the second network metric caused by the network enhancement operation.

2. The method of claim 1, further comprising:
    determining a predicted value of the first network metric after the network enhancement operation based on a simplified cell model;
    determining an intermediate predicted value of the second network metric after the network enhancement operation based on the trend of the second network metric and the predicted value of the first network metric after the network enhancement operation; and
    determining the predicted value of the second network metric of the area of interest after the network enhancement operation based on the intermediate predicted value of the second network metric after the network enhancement operation.

3. The method of claim 2, wherein the reference value of the first network metric is a measured value of the first network metric at current time, and wherein the predicted gain of the second network metric is determined by comparing the predicted value of the second network metric after the network enhancement operation to a current value of the second network metric before the network enhancement operation.

4. The method of claim 2, further comprising:
determining a mid-term or long-term trend of the first network metric over a period of time;
determining a first predicted future value of the first network metric of a future time based on the mid-term or long-term trend of the first network metric; and
determining a second predicted future value of the second network metric of the future time based on the first predicted future value of the first network metric of the future time.

5. The method of claim 4, wherein the reference value of the first network metric is the predicted future value of the first network metric of the future time, and wherein the predicted gain of the second network metric is determined by comparing the predicted value of the second network metric after the network enhancement operation at the future time to the second predicted future value of the second network metric before the network enhancement operation of the future time.

6. The method of claim 2, wherein the first network metric is number of samples, and wherein the second network metric is network traffic.

7. The method of claim 6, wherein the network enhancement operation comprises adding a new cell in the geographic area of interest, wherein the network traffic is equally split between an existing cell of the geographic area of interest and the new cell based on the simplified cell model.

8. The method of claim 1, further comprising:
optimizing the communication network in the geographic area of interest based on the one or more network optimization recommendations.

9. The method of claim 1, wherein the data samples are collected at application level or infrastructure level, and wherein the data samples comprise information related at least to the first and second network metrics.

10. The method of claim 1, wherein the plurality of data points is aggregated per hour per N days, and wherein N is any positive integer number.

11. The method of claim 10, wherein the plurality of data points is aggregated per hour per week, and wherein the plurality of data points correlates the first network metric to the second network metric.

12. The method of claim 1, wherein the first threshold is a 50-percentile threshold of the first network metric.

13. The method of claim 1, wherein the first threshold is a median value threshold of the first network metric.

14. The method of claim 1, wherein the first set of data points is below the first threshold of the first network metric and corresponds to non-busy hours, and wherein the second set of data points is above the first threshold and corresponds to busy hours.

15. The method of claim 1, wherein the trend of the second network metric with respect to the first network metric is determined based on a first trend function and a second trend function, wherein the first trend function is determined based on a first regression on the first set of data points, wherein the second trend function is determined based on a second regression on the second set of data points, and wherein the first and second regression are linear regression or non-linear regression.

16. The method of claim 1, wherein the first network metric is number of samples, and wherein the second network metric is download speed.

17. The method of claim 16, further comprising:
splitting the plurality of aggregated data points into the first set of data points and the second set of data points using a second threshold of the first network metric, wherein the first set of data point is below the second threshold of the first network metric;
determining a first weighted average of the second network metric based on the plurality of data points comprising the first and second sets of data points; and
determining a second weighted average of the second network metric based on the first set of data points, wherein the predicted gain of the second network metric is determined by comparing the first and second weighted average of the second network metric.

18. The method of claim 17, wherein the second threshold of the first network metric equal to 0.5 times of a maximum value of the first network metric.

19. One or more computer-readable non-transitory storage media embodying software that is operable when executed by one or more processors to:
access data samples associated with an area of interest covered by a communication network, wherein the data samples are aggregated into a plurality of data points;
partition the plurality of data points into a first set of data points and a second set of data points using a first threshold of a first network metric;
determine a trend of a second network metric with respect to the first network metric based on a regression analysis on the first and second sets of data points;
determine a predicted gain of the second network metric for a network enhancement operation, wherein the predicted gain of the second network metric is determined based on a difference between the trend of the second network metric and a predicted value of the second network metric after the network enhancement operation with respect to a reference value of the first network metric; and
generate one or more network optimization recommendations for the geographic area of interest based at least in part on the predicted gain of the second network metric caused by the network enhancement operation.

20. A system comprising: one or more non-transitory computer-readable storage media embodying instructions; and one or more processors coupled to the storage media and operable to execute the instructions to:
access data samples associated with a geographic area of interest covered by a communication network, wherein the data samples are aggregated into a plurality of data points;
partition the plurality of data points into a first set of data points and a second set of data points using a first threshold of a first network metric;
determine a trend of a second network metric with respect to the first network metric based on a regression analysis on the first and second sets of data points;
determine a predicted gain of the second network metric for a network enhancement operation, wherein the predicted gain of the second network metric is determined based on a difference between the trend of the second network metric and a predicted value of the second network metric after the network enhancement operation with respect to a reference value of the first network metric; and
generate one or more network optimization recommendations for the geographic area of interest based at least in part on the predicted gain of the second network metric caused by the network enhancement operation.

* * * * *